(12) United States Patent
Ahn et al.

(10) Patent No.: US 12,306,668 B2
(45) Date of Patent: May 20, 2025

(54) WEARABLE ELECTRONIC DEVICE INCLUDING ADJUSTING PART

(71) Applicant: SAMSUNG ELECTRONICS CO., LTD., Suwon-si (KR)

(72) Inventors: Kyoungjin Ahn, Suwon-si (KR);
Yeongmin Park, Suwon-si (KR);
Jiseong Hwang, Suwon-si (KR);
Kyeongsoo Kim, Suwon-si (KR);
Sungmin Kim, Suwon-si (KR);
Sangjin Wang, Suwon-si (KR);
Younsang Yoo, Suwon-si (KR);
Byounguk Yoon, Suwon-si (KR);
Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 18/153,147

(22) Filed: Jan. 11, 2023

(65) Prior Publication Data
US 2023/0168716 A1 Jun. 1, 2023

Related U.S. Application Data

(63) Continuation of application No. PCT/KR2021/005996, filed on May 13, 2021.

(30) Foreign Application Priority Data

Jul. 21, 2020 (KR) .......................... 10-2020-0090064

(51) Int. Cl.
*G06F 1/16* (2006.01)
(52) U.S. Cl.
CPC .................... *G06F 1/163* (2013.01)

(58) Field of Classification Search
None
See application file for complete search history.

(56) References Cited

U.S. PATENT DOCUMENTS

| 8,336,114 | B1 | 12/2012 | Lee |
| 9,551,405 | B1 | 1/2017 | Chen |
| 2005/0262619 | A1 | 12/2005 | Musal et al. |
| 2015/0074876 | A1 | 3/2015 | Chiang |
| 2015/0316773 | A1 | 11/2015 | Tazbaz et al. |

(Continued)

FOREIGN PATENT DOCUMENTS

| CN | 110824715 A | 2/2020 |
| JP | 2018-19141 A | 2/2018 |

(Continued)

OTHER PUBLICATIONS

Communication issued on Dec. 13, 2023 by the European Patent Office in European Patent Application No. 21845211.8.

(Continued)

*Primary Examiner* — James Wu
*Assistant Examiner* — Christopher L Augustin
(74) *Attorney, Agent, or Firm* — Sughrue Mion, PLLC

(57) ABSTRACT

A wearable electronic device includes a display component, wearing frames extending from the display component, and an adjusting component slidably coupled with the wearing frames, the adjusting component including a case including first slide holes extending in a first direction, first slide members provided inside the case and coupled with one of the wearing frames through one of the first slide holes, second slide members coupled with the first slide members, respectively, and a driving structure provided in the case, where, with rotation of the driving structure, the second slide members are configured to slide the first slide members in the first direction while moving in a second direction different from the first direction.

15 Claims, 15 Drawing Sheets

(56) References Cited

U.S. PATENT DOCUMENTS

| | | |
|---|---|---|
| 2016/0250092 A1 | 9/2016 | Ma et al. |
| 2018/0295733 A1* | 10/2018 | Wen .................. G02C 3/003 |
| 2018/0299681 A1* | 10/2018 | Eastwood ............. G02C 11/10 |
| 2018/0364490 A1* | 12/2018 | Lin .................. G02B 27/0176 |
| 2019/0191813 A1 | 6/2019 | Liu et al. |
| 2019/0220056 A1* | 7/2019 | Yan .................. G02B 27/0176 |
| 2020/0213708 A1* | 7/2020 | Wang .................. H04R 1/1066 |
| 2020/0278556 A1 | 9/2020 | Chae et al. |
| 2020/0310488 A1* | 10/2020 | Lin .................. G02B 27/0176 |
| 2021/0026148 A1 | 1/2021 | Yoon et al. |
| 2021/0041909 A1 | 2/2021 | Ahn |
| 2021/0315301 A1* | 10/2021 | Wang .................. A41D 20/00 |
| 2021/0333558 A1 | 10/2021 | Wang et al. |
| 2022/0299781 A1* | 9/2022 | Ran .................. G02B 27/0172 |

FOREIGN PATENT DOCUMENTS

| | | |
|---|---|---|
| KR | 10-1681106 B1 | 11/2016 |
| KR | 10-2018-0113449 A | 10/2018 |
| KR | 10-2018-0115221 A | 10/2018 |
| KR | 10-2019-0109980 A | 9/2019 |
| KR | 10-2019-0111628 A | 10/2019 |
| WO | 2018/023939 A1 | 2/2018 |

OTHER PUBLICATIONS

International Search Report dated Aug. 18, 2021, issued by the International Searching Authority in counterpart International Application No. PCT/KR2021/005996 (PCT/ISA/210).

Written Opinion dated Aug. 18, 2021, issued by the International Searching Authority in counterpart International Application No. PCT/KR2021/005996 (PCT/ISA/237).

Communication issued Mar. 21, 2025 by the Korean Intellectual Property Office for Korean Patent Application No. 10-2020-0090064.

* cited by examiner

WEARABLE ELECTRONIC DEVICE INCLUDING ADJUSTING PART

CROSS-REFERENCE TO RELATED APPLICATION(S)

This application is a bypass continuation of International Application No. PCT/KR2021/005996, filed on May 13, 2021, in the Korean Intellectual Property Receiving Office, which is based on and claims priority to Korean Patent Application No. 10-2020-0090064, filed on Jul. 21, 2020, in the Korean Intellectual Property Office, the disclosures of which are incorporated herein by reference in their entireties.

BACKGROUND

1. Field

The disclosure relate to an electronic device, for example, a wearable electronic device which may be used while being worn on a body.

2. Description of Related Art

Along with the development of electronic, information, and communication technologies, various functions have been integrated into one electronic device. For example, an electronic device (e.g., a smart phone) includes functions such as an audio player, an imaging device, or an electronic notebook as well as a communication function, and more various functions may be implemented in the smart phone by installing additional applications. The electronic device may receive various types of information in real time by not only executing a loaded application or a stored function, but also accessing a server or other electronic device wiredly or wirelessly.

As electronic devices become common in daily use, user demands for portability and usability of the electronic devices may increase. In response to such user demands, an electronic device that may be carried and used while worn on the body such as a wrist watch or glasses has been commercialized. Among wearable electronic devices, an electronic device wearable on a user's face may be useful in implementing virtual reality or augmented reality. For example, the wearable electronic device may implement virtual reality by providing a three-dimensional image of a virtual space in a game enjoyed on a television or a computer monitor, while blocking an image of a real space in which the user stays. Another type of wearable electronic device may implement augmented reality that provides various pieces of visual information to the user by implementing a virtual image while providing an environment in which a user may visually recognize an image of a real space in which the user stays.

An electronic device wearable on a user's face or head becomes smaller and lighter, and may have a processor, a communication module, and/or a battery embedded therein. For example, the user may use the wearable electronic device in a wireless use environment, even though it is not connected to another electronic device or a power supply in a wired manner. Compared to a wired electronic device, the wearable electronic device may have limitations in weight reduction, because it has an electronic component such as a circuit board with the processor or the communication module disposed thereon, and/or the battery for use in the wireless use environment. For example, although the wireless wearable electronic device may provide a more free use environment relative to the wired electronic device, it may offer reduced wearability because of more embedded electronic components.

SUMMARY

Provided is a wearable electronic device which may be conveniently used in a wireless use environment.

Provided is a wearable electronic device which may prevent load concentration on a user's specific body part in a worn state.

Provided is a wearable electronic device with improved wearability by appropriately distributing various electronic components such as a circuit board and/or a battery.

Provided is a wearable electronic device including a wiring structure which is concealed from the outside while electrically connecting electrical objects arranged in a distributed manner.

Additional aspects will be set forth in part in the description which follows and, in part, will be apparent from the description, or may be learned by practice of the presented embodiments.

According to an aspect of the disclosure, a wearable electronic device may include a display part, wearing frames extending from the display part, and an adjusting part slidably coupled with the wearing frames, the adjusting part including a case including first slide holes extending in a first direction, first slide members provided inside the case and coupled with one of the wearing frames through one of the first slide holes, second slide members coupled with the first slide members, respectively, and a driving structure provided in the case, where, with rotation of the driving structure, the second slide members are configured to slide the first slide members in the first direction while moving in a second direction different from the first direction.

With a sliding movement of the first slide members, the wearing frames may be configured to contact an outer surface of the case.

The wiring frames may include a first portion contacting the case, and a second portion not contacting the case, where the first portion may have a higher flexibility than the second portion.

The adjusting part may include at least one first slide boss on the first slide members, and the at least one first slide boss may be located in a first slide hole and is fastened to one of the wearing frames.

The wearable electronic device may include first wiring holes on the first slide members, and second wiring holes on the wearing frames and facing the first wiring holes, where the first wiring holes and the second wiring holes may at least partially overlap with the first slide holes.

The wearable electronic device may include at least one electronic component provided in the case, and a cable or a flexible printed circuit board connected to the at least one electronic component, where the cable or the flexible printed circuit board may be wired into one of the wearing frames through at least one of the first wiring holes, at least one of the first slide holes, and at least one of the second wiring holes.

The at least one electronic component may include at least one of a circuit board and a battery.

The driving structure may include a rotation gear provided in the case, and a rotary handle provided on an outer surface of the case and configured to rotate together with the rotation gear, where the second slide members may include rack gears configured to mesh with the rotation gear, and with rotation of the rotation gear, the second slide members may be configured to slide in the second direction by way of the rack gears meshing with the rotation gear.

The driving structure may include a first gear base provided on an inner surface of the case and on the rotary handle, and a second gear base coupled with the first gear base and facing the first gear base, where the rotation gear may be on the second gear base.

The adjusting component may include a first holder member facing the inner surface of the case, where at least a portion of the driving structure is between the first holder member and the inner surface of the case, the second gear base may face a first surface of the first holder member, and the rotation gear may penetrate the first holder member and is configured to mesh with the rack gears on a second surface of the first holder member.

The adjusting component may include a second holder member coupled with the first holder member and facing the first holder member, where at least portions of the second slide members may be provided between the first holder member and the second holder member.

The wearable electronic device may include second slide holes on the wearing frames, and at least one second slide boss provided on the case, where, with sliding movement of the first slide members, the at least one second slide boss may be configured to slide inside a second slide hole.

The wearing frames may be configured to at least partially conceal the first slide holes at a first position, and the first slide members may be configured to at least partially close the first slide holes at a second position different from the first position.

The wearable electronic device may include a cable or a flexible printed circuit board connected to the display component, and the cable or the flexible printed circuit board may be wired from inside the wearing frames into the case by penetrating the wearing frames and the first slide members.

The wearable electronic device may include a circuit board or a battery inside the case, where the circuit board or the battery may be connected to the display component through the cable or the flexible printed circuit board.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
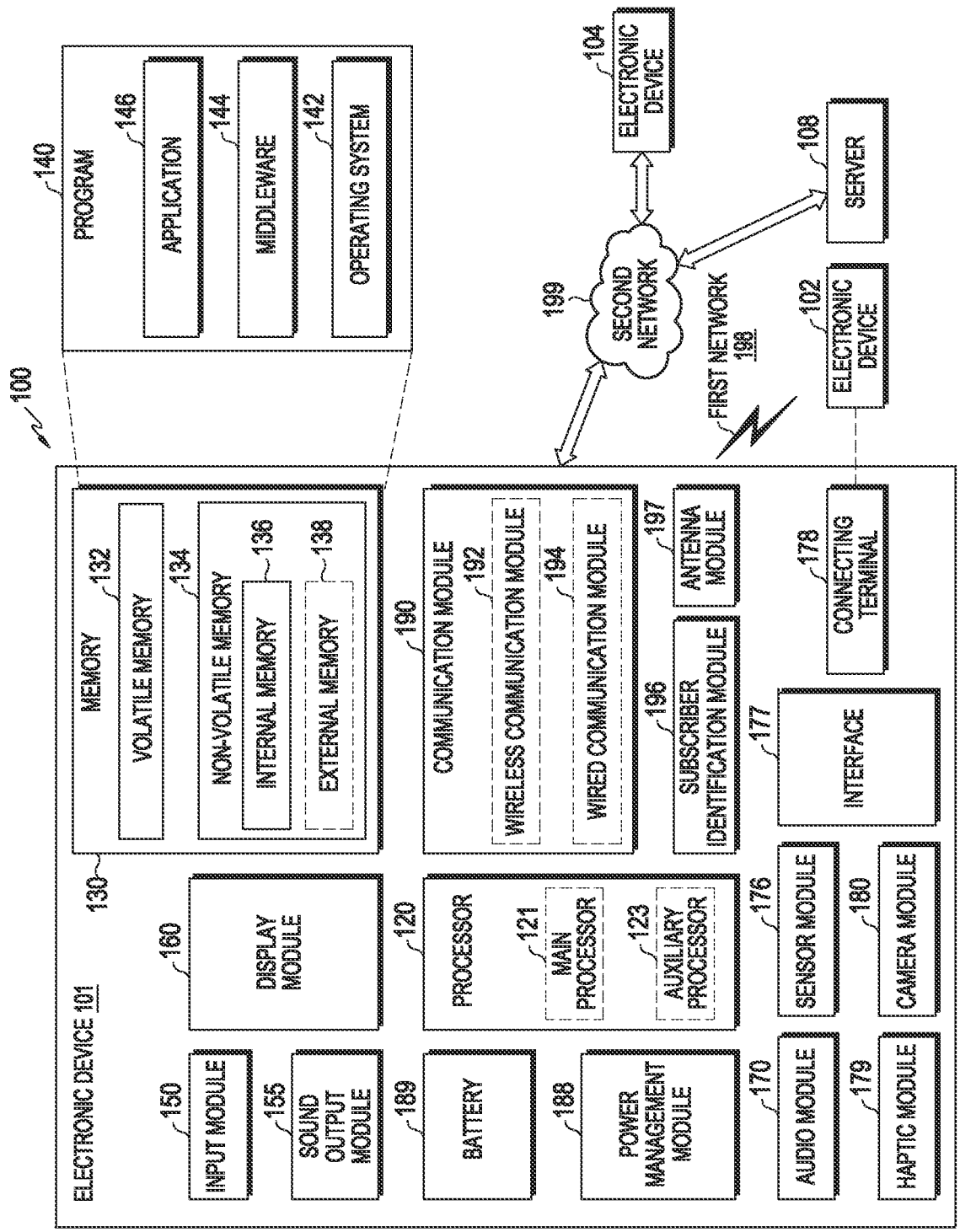
FIG. 1 is a block diagram illustrating an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
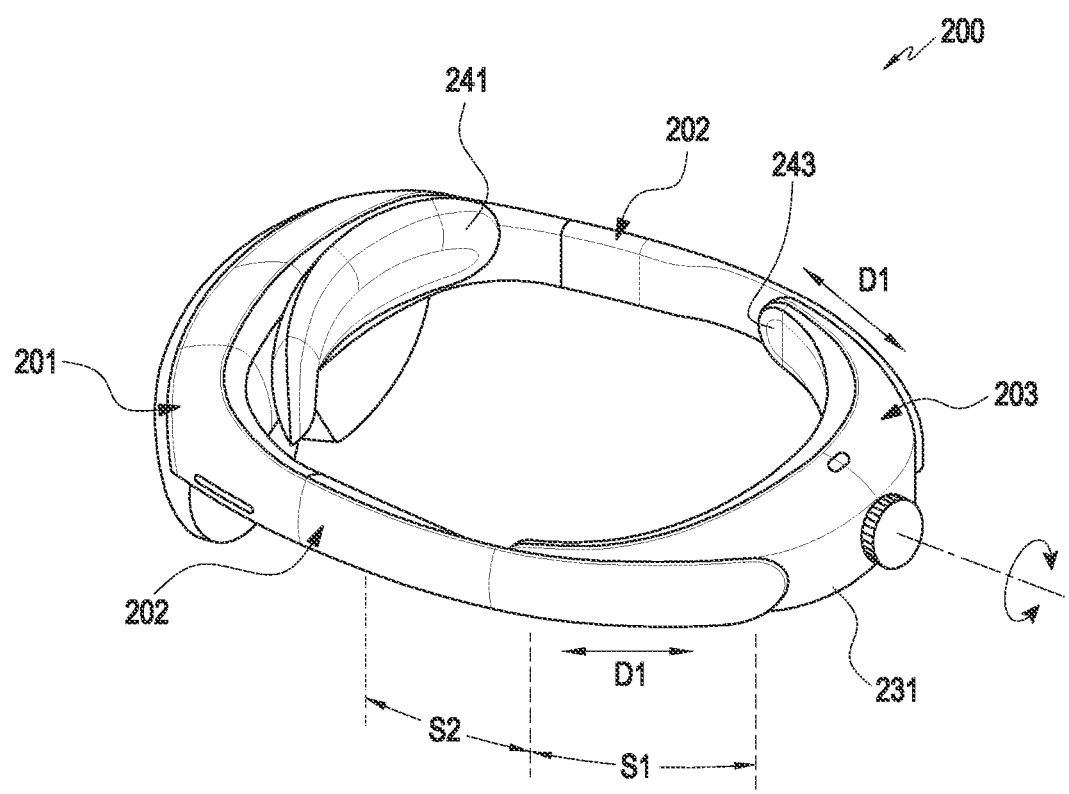
FIG. 2 is a diagram illustrating a wearable electronic device according to various embodiments of the disclosure.
Figure 3:
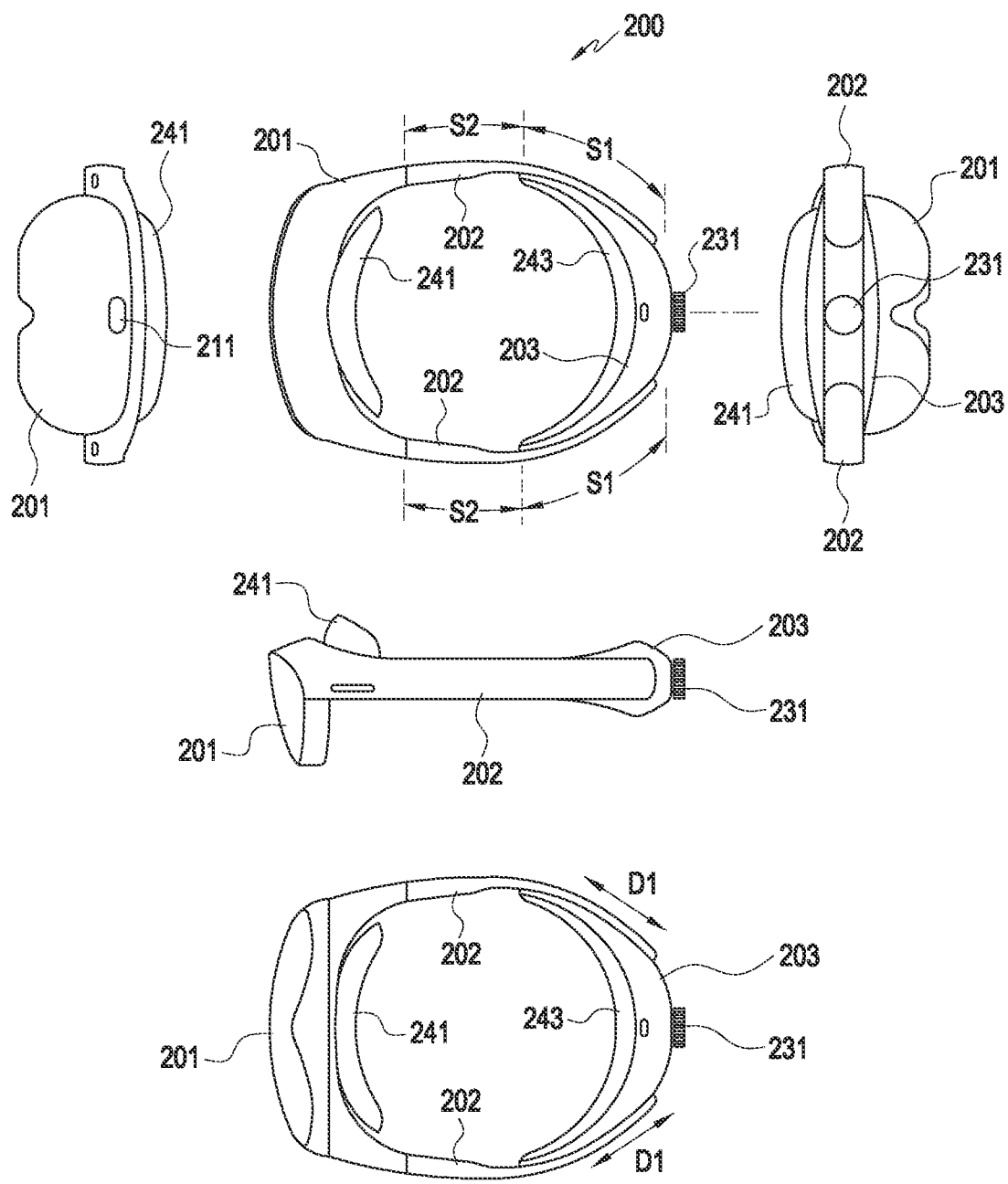
FIG. 3 is a diagram illustrating a wearable electronic device according to various embodiments of the disclosure.

FIG. 2 is a diagram illustrating a wearable electronic device 200 (e.g., the electronic device 101, 102, or 104 of FIG. 1) according to various embodiments of the disclosure. FIG. 3 is a 5-sided diagram illustrating the wearable electronic device 200 according to various embodiments of the disclosure.

Referring to FIGS. 2 and 3, the wearable electronic device 200 may include a display part 201, a wearing frame 202, and/or an adjusting part 203, and may further include at least one cushion member 241 and 243 disposed at a position directly contacting a user's body. A pair of wearing frames 202 may be provided and extend from the display part 201. The adjusting part 203 may be slidably coupled with the wearing frames 202. In a plan view or a bottom view, the wearable electronic device 200 may be shaped into a closed curve. For example, the display part 201, the wearing frames 202, and/or the adjusting part 203 may be arranged or coupled to form a closed curve. The user may adjust a wearing state of the wearable electronic device 200 by sliding the adjusting part 203 with respect to the wearable frames 202. For example, as the adjusting part 203 slides with respect to the wearing frames 202, the closed curve may be extended or reduced, and the user may adjust a close contact or support state between the wearable electronic device 200 and the user's body (e.g., head).

According to various embodiments, the cushion members 241 and 243 may include a first cushion member 241 disposed on the display part 201 and a second cushion member 243 disposed on the adjusting part 203. When worn on the user's body, the first cushion member 241 may contact or be supported by the user's forehead, and the second cushion member 243 may contact or be supported by the back of the user's head. For example, the user may use the wearable electronic device 200, while wearing it on the head, and the cushion members 241 and 243 may alleviate or distribute a load imposed on the user's body by the weight of the wearable electronic device 200. The wearable electronic device 200 may further include an auxiliary frame. For example, the auxiliary frame may be extended from the display part 201, connected to the adjusting part 203, and supported on an upper part of the user's head. For example, the wearable electronic device 200 may be worn on the user's body, while contacting or being supported by the user's forehead, the back of the head, and/or the upper part of the head. When including the auxiliary frame, the wearable electronic device 200 may include an additional cushion member in direct contact with the upper part of the user's head. For example, the additional cushion member may be disposed between the user's body and the auxiliary frame.

According to various embodiments, with the wearable electronic device 200 worn on the user, the display part 201 may be disposed substantially in correspondence with the user's eyes. In an embodiment, the display part 201 may include a projector and an optical waveguide structure. For example, the display part 201 may output visual information through the projector and provide the visual information to the user's eyes through the optical waveguide structure. In another embodiment, the display part 201 may include a flat display panel, for example, a liquid crystal display (LCD) panel, an organic light emitting diode (OLED), and/or a micro-LED, and output visual information through the flat display panel to provide the visual information to the user's eyes. In another embodiment, the display part 201 may include an external electronic device, for example, a structure in which a smartphone may be mounted, to place the smartphone in correspondence with the user's eyes. For example, while the display part 201 has been described as including a projector and a flat display panel, the disclosure is not limited to this configuration, and the wearable electronic device 200 may be used, with an external electronic device mounted thereon according to an embodiment.

According to various embodiments, the display part 201 may provide the user with visual information (e.g., an image or video in which a virtual space is implemented) output through the projector or the flat display panel, while substantially blocking a real image of an ambient environment. For example, the wearable electronic device 200 may implement virtual reality and provide the virtual reality to the user. In another embodiment, the display part 201 may include a camera module 211, capture the ambient environment in a direction the user looks at, and provide the captured image to the user through the projector or the flat display panel. In some embodiments, the wearable electronic device 200 may extract information about an image captured in real time from its stored data or data collected through a network environment (e.g., the first network 198 and/or the second network 199 of FIG. 1), combine the captured image with the extracted information, and provide the combination to the user. For example, the wearable electronic device 200 may implement augmented reality and provide the augmented reality to the user. In another embodiment, the display part 201 may transmit a real image of the ambient environment to the user, and visually provide information about an image or video captured through the camera module 211 to the user.

According to various embodiments, the pair of wearing frames 202 may extend from the display part 201, and while worn on the user's body, may be located while facing sides of the user's head. In some embodiments, the wearing frames 202 may be formed at least partially integrally with the display part 201. For example, each of the wearing frames 202 may include an inner frame (e.g., an inner frame 202a of FIG. 4) facing user's body and an outer frame (e.g., an outer frame 202b of FIG. 4) disposed toward an outer space, and one of the inner frame 202a and the outer frame 202b may be formed integrally with the display part 201.

According to various embodiments, each of the wearing frames 202 may include a first segment S1 that comes into slip contact with the adjusting part 203, and a second segment S2 that connects the first segment S1 to the display part 201. According to an embodiment, as the adjusting part 203 slides with respect to the wearing frames 202 in first directions D1 and/or the wearing frames 202 slide with respect to the adjusting part 203 in the first directions D1, contact areas between the adjusting part 203 and the first segments S1 may be reduced or extended. The "first directions D1" are shown as straight in FIG. 2 and/or FIG. 3, for simplicity of description, which does not limit the disclosure. The first directions D1 may refer to curved trajectories. For example, the "first directions D1" may be actually determined by substantially the shape of the outer surface of the adjusting part 203, for example, the shapes of parts contacting the first segments S1, and the first segments S1 may move along the curved trajectories corresponding to the shape of the outer surface of the adjusting part 203. In another embodiment, the wearing frames 202 may be disposed to be substantially symmetrical with respect to the adjusting part 203, and a movement direction of the adjusting part 203 with respect to one of the two wearing frames 202 may be substantially symmetrical to a movement direction of the adjusting part 203 with respect to the other wearing frame 202. For example, although the movement direction of the adjusting part 203 may be different depending on which of the two wearing frames 202 is used as a reference, the movement directions of the adjusting part 203 with respect to the wearing frames 202 are defined as the "first directions D1", for simplicity of description.

According to various embodiments, areas of the first segments S1 directly contacting the adjusting part 203 may be brought into close contact with the outer surface of the adjusting part 203, while being kept in a shape (e.g., a curve or curved surface) corresponding to the outer surface of the adjusting part 203. Areas of the first segments S1 not in contact with the adjusting part 203 may be kept substantially in the shape of a straight line. For example, areas of the first segments S1 between the second segments S2 and the adjusting part 203 may be maintained in the shape of straight lines without contacting the adjusting part 203. According to an embodiment, the first segment S1 of each of the wearing frames 202 may be deformed between the straight line and the curve or curved surface, because the first segment S1 is flexible. In another embodiment, the second segments S2, which are parts mechanically fastened to or mounted on the display part 201, may have a lower flexibility than the first segments S1. For example, the second segments S2 may have a higher mechanical strength than the first segments S1 and be fastened to the display part 201 by fastening elements such as screws.

According to various embodiments, the adjusting part 203 may substantially contact or be supported by the back of the user's body (e.g., head), and may be slidably coupled with the wearing frames 202. For example, the outer surface of the adjusting part 203 may come into slip contact with the outer surfaces of the wearing frames 202. In some embodiments, when the adjusting part 203 has a curved surface in a slip contact part thereof, the first segments S1 may be deformed in correspondence with the shape of the curved surface of the adjusting part 203. For example, the first segments S1 may slide on the adjusting part 203 in close contact with the outer surface of the adjusting part 203. It is noted from the plan view or the bottom view of FIG. 3 that as the adjusting part 203 moves in the first directions D1, the curvature of the first segments S1 may change.

According to various embodiments, due to the change of the curvature of the first segments S1, a relative displacement may occur between surfaces (hereinafter referred to as 'contact surfaces') of the first segments S1 in contact with the adjusting part 203 and surfaces (hereinafter referred to as 'non-contact surfaces') of the first segments S1 facing an external space. For example, when the adjusting part 203 slides in the first directions D1, there may be a difference between a movement distance of the contact surfaces and a movement distance of the non-contact surfaces. The relative displacement may be proportional to the thickness of the first segments S1 in the plan view or bottom view of FIG. 3. In an embodiment, the inner frames 202a and the outer frames 202b of the wearing frames 202 may move in the first directions D1 with respect to each other. For example, when the adjusting part 203 moves in the first directions D1, the inner frames 202a and the outer frames 202b may move in the first directions D1 with respect to each other to allow the difference between the movement distance of the contact surfaces and the movement distance of the non-contact surfaces. In some embodiments, when the curvature of the first segments S1 increases, the inner frames 202a may be reduced while the outer frames 202b may be extended, or the relative positions of the inner frames 202a and the outer frames 202b may be changed, thereby allowing the difference between the movement distance of the contact surfaces and the movement distance of the non-contact surfaces. For example, the wearing frames 202 may allow deformation (e.g. the change of the curvature) of the first segments S1 through a difference in relative movements or reduction/extension degrees of the inner frames 202a and the outer frames 202b. Due to the relative position change or the relative movement, the inner frames 202a and the outer frames 202b may come into slip contact with each other.

According to various embodiments, the adjusting part 203 may include a rotary handle 231. The rotary handle 231 may be disposed to be rotatable around a rotation axis A1 on the wearable electronic device 200, and the rotary motion of the rotary handle 231 may be converted into a linear motion inside the adjusting part 203. For example, the user may slide the adjusting part 203 with respect to the wearing frames 202 by rotating the rotary handle 231.

According to various embodiments, the wearable electronic device 200 may include various electronic components such as a camera module 211, a projector, a flat display panel, sensors, a circuit board, and/or a battery. The electronic components may be arranged in the display part 201, the wearing frames 202, and/or the adjusting part 203 and electrically connected to each other through wirings (e.g. wirings 363 of FIG. 21). In an embodiment, the wearing frames 202 may at least partially accommodate the wirings (e.g., the wirings 363 of FIG. 21). For example, as the electronic components are appropriately distributed to at least the display part 201 and the adjusting part 203, concentration of a load caused by the weight of the wearable electronic device 200 on a specific part of the user's body may be prevented. In another embodiment, the cushion members 241 and 243 may extend an area over which the wearable electronic device 200 directly contacts the user's body, thereby distributing the load of the wearable electronic device 200 and alleviating the user's fatigue. In another embodiment, the distributed electronic components may be electrically connected to each other through the wirings which are concealed, and the wearable electronic device 200 may look sophisticated in view of the concealed wirings.

An embodiment of the adjusting part 203 in the wearable electronic device 200 will be described below in detail with reference to FIGS. 4 to 22. To describe the embodiment of the adjustment part 203, reference may be made to the electronic devices 101, 102, 104, and 200 of FIGS. 1, 2 and 3.

Figure 4:
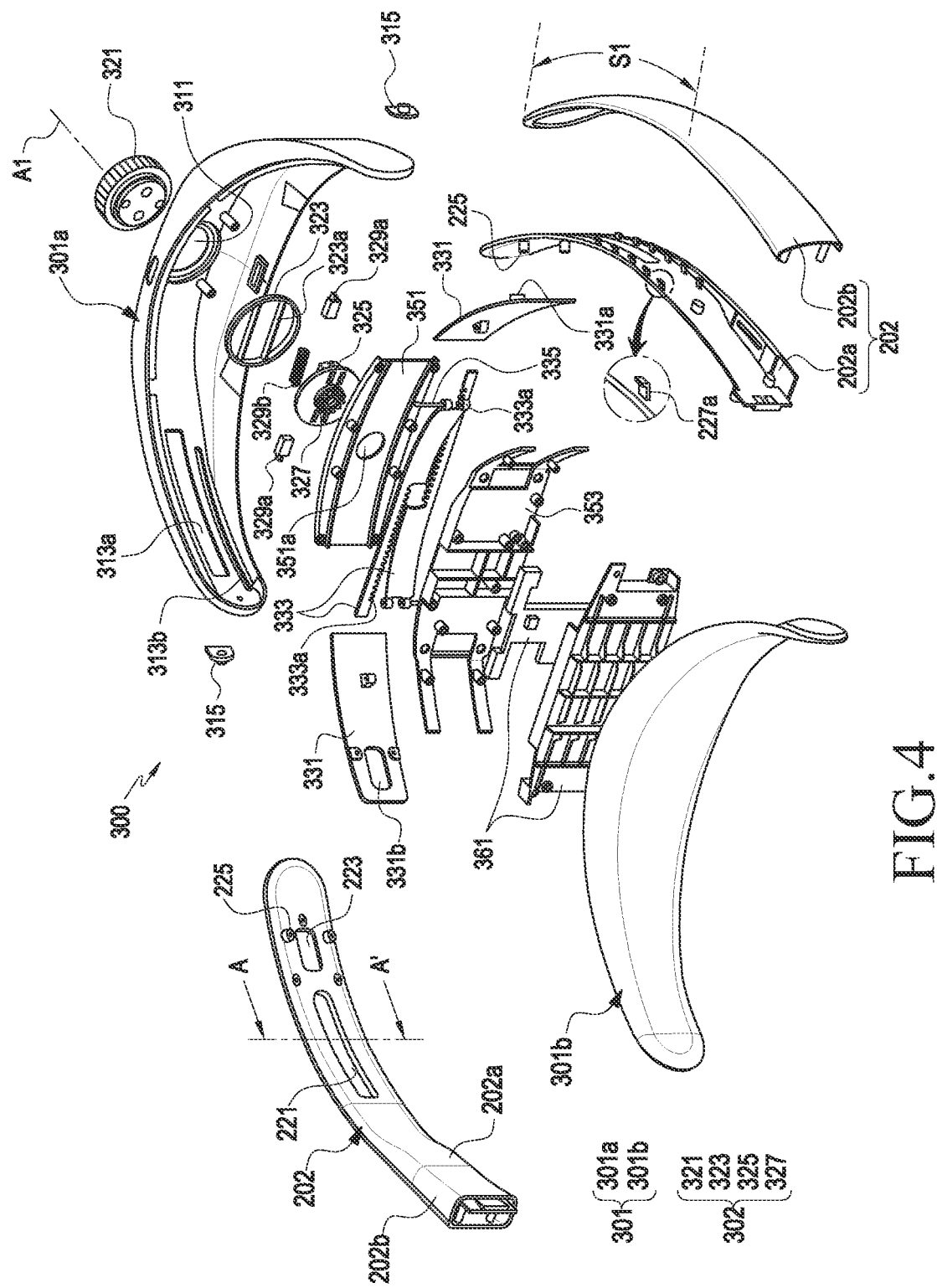
FIG. 4 is a diagram illustrating an adjusting part in a wearable electronic device according to various embodiments of the disclosure.
Figure 5:
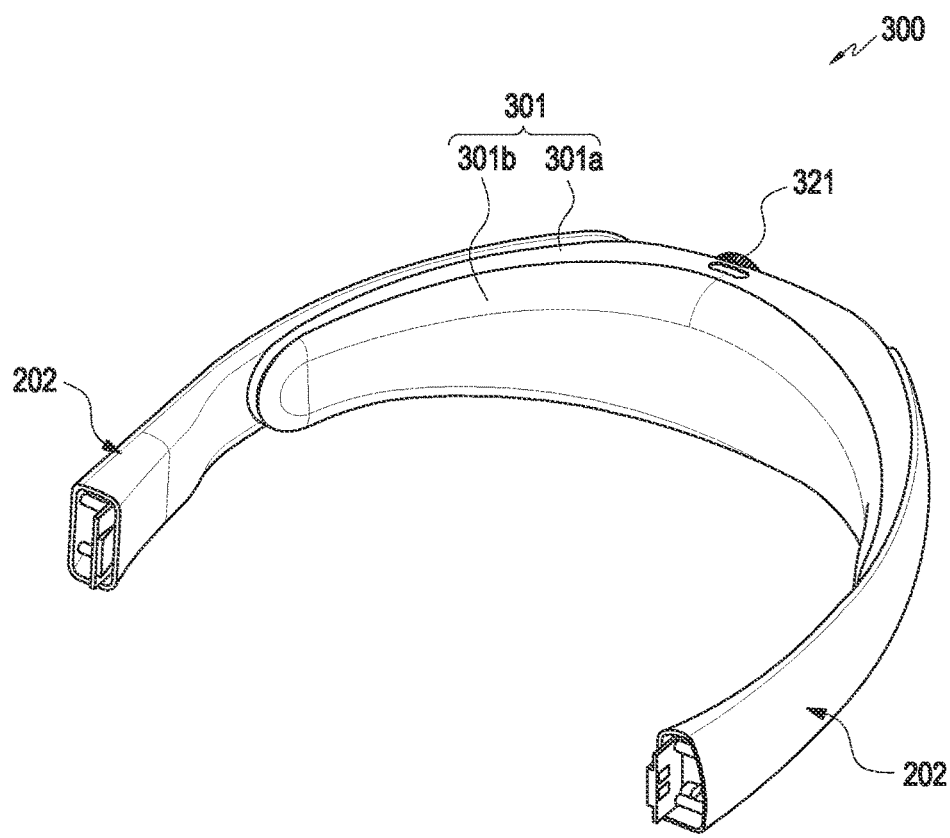
FIG. 5 is a diagram illustrating an adjusting part in a wearable electronic device according to various embodiments of the disclosure.

FIG. 4 is a diagram illustrating an adjusting part 300 (e.g., the adjusting part 203 of FIG. 2 or FIG. 3) in a wearable electronic device (e.g., the electronic device 101, 102, or 104 of FIG. 1 or the wearable electronic device 200 of FIG. 2) according to various embodiments of the disclosure. FIG. 5 is a diagram illustrating the adjusting part 300 in the wearable electronic device 200 according to the various embodiments of the disclosure.

Referring to FIGS. 4 and 5, the adjusting part 300 (e.g., the adjusting part 203 of FIG. 2 or FIG. 3) may include a case 301, a driving structure 302, and/or slide members 331 and 333. The case 301 may be slidably coupled with the wearing frame(s) 202. In an embodiment, at least one of the slide members 331 and 333 may be slidable inside the case 301, while being mounted or fixed to the wearing frames 202. The driving structure 302 may include, for example, the rotary handle 231 of FIG. 2, and a rotational motion of the driving structure 302 may be converted into a sliding motion of the slide members 331 and 333 in the case 301. In another embodiment, the slide members 331 and 333 may include a pair of first slide members 331 and a pair of second slide members 333, which are shaped into substantially flat plates. The second slide members 333 may be rotatably coupled with the first slide members 331. The first slide members 331 may slide substantially along the first directions D1 of FIG. 2 or FIG. 3, and the second slide members 333 may slide along second directions (e.g., second directions D2 of FIG. 12) different from the first directions D1. In another embodiment, electronic components (e.g., a circuit board 365a and/or a battery 365b of FIG. 21) may be disposed in an internal space of the adjusting part 300 and electrically connected to a display part (e.g., the display part 201 of FIG. 2 or FIG. 3) through wirings (e.g., cables and/or flexible printed circuit boards as the wirings 363 of FIG. 21) disposed inside the wearing frames 202.

According to various embodiments, the case 301 may include a first case member 301a and a second case member 302b, and may be located behind the user's body (head), when the wearable electronic device 200 is worn. In an embodiment, the second case member 301b may substantially directly contact the user's body, and the second cushion member 243 of FIG. 2 or FIG. 3 may be provided on the second case member 301b. For example, the first case member 301a and the second case member 301b may be shaped into an arc that at least partially wraps the back of the user's head. At least part of the driving structure 302 and the slide members 331 and 333 may be accommodated in an internal space of the case 301.

According to various embodiments, the case 301 may include a driving hole 311 and first slide holes 313a formed on the first case member 301a. The driving hole 311 may be formed to penetrate the first case member 301a to provide a mechanism with which the driving structure 302 is rotatably coupled. The first slide holes 313a may be formed to penetrate the first case member 301a, and symmetrical with respect to the driving hole 311. In an embodiment, the first slide holes 313a may extend in a direction away from the driving hole 311 at positions spaced apart from the driving hole 311. Lengths to which the first slide holes 313a extend may define a slidable range of the adjusting part 300 with respect to the wearing frames 202. In another embodiment, the slidable range of the adjusting part 300 may be set by a range in which the slide members 331 and 333 (e.g., the first slide members 331) are movable in the case 301.

According to various embodiments, the case 301 may include at least one guide hole 313b formed to penetrate the first case member 301a. In FIG. 4, guide holes 313b may be located above and/or under the first slide holes 313a and extend substantially in parallel to the first slide holes 313a. As described later, the first slide holes 313a and/or the guide hole(s) 313b may provide a passage or space in which the first slide members 331 may be coupled with the wearing frames 202, and guide the sliding movement of the adjusting part 300 with respect to the wearing frame(s) 202.

According to various embodiments, the driving structure 302 may include a rotary handle 321 (e.g., the rotary handle 231 of FIG. 2) and/or a rotation gear 327. In some embodiments, the driving structure 302 may include at least one gear base disposed between the rotary handle 321 and the rotation gear 327, for example, a first gear base 323 and a second gear base 325. In an embodiment, the rotary handle 321 may be disposed on the driving hole 311, while being supported by the outer surface of the first case member 301a, and rotate around the rotation axis A1. The user may adjust the wearing state (e.g., close contact degree) of the wearable electronic device 200 by rotating the rotary handle 321.

Figure 6:
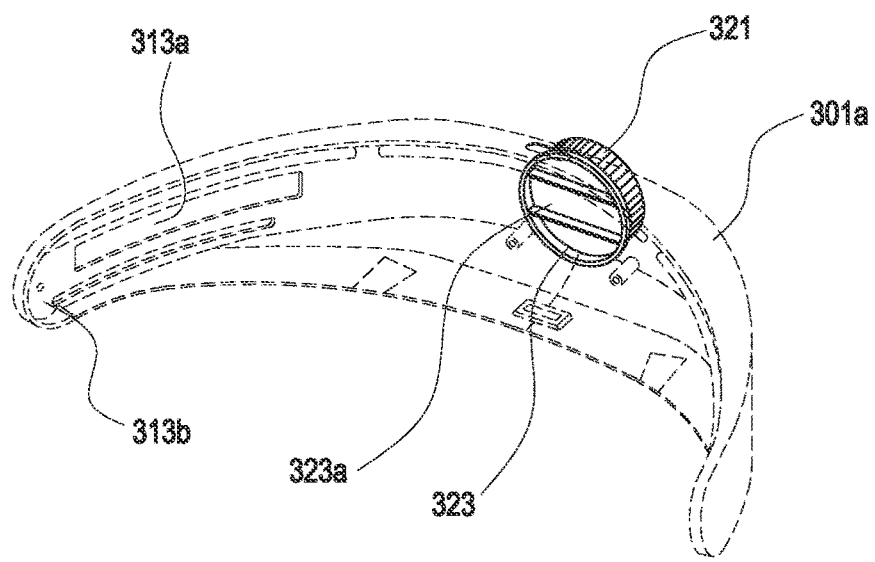
FIG. 6 is a diagram illustrating an adjusting part with a rotary handle assembled therein in a wearable electronic device according to various embodiments of the disclosure.

FIG. 6 is a diagram illustrating an adjusting part (e.g., the adjusting part 203 or 300 of FIG. 2 or FIG. 4) with the rotary handle 321 (e.g., the rotary handle 231 of FIG. 2) assembled therein in a wearable electronic device (e.g., the wearable electronic device 200 of FIG. 2) according to various embodiments of the disclosure.

Referring further to FIG. 6 together with FIG. 4, the first gear base 323 may be disposed on the driving hole 311, with its inner surface supported by an inner surface of the first case member 301a, and rotate around the rotation axis A1. The first gear base 323 may be mounted or fixed to the rotary handle 321 through the driving hole 311. For example, the rotary handle 321 may be coupled with the first gear base 323, with part of the first case member 301a interposed between the rotary handle 321 and the first gear base 323, so that the driving structure 302 may be substantially coupled to be rotatable on the driving hole 311 and/or the first case member 301a. In an embodiment, the first gear base 323 may include an accommodation groove 323a formed on one surface thereof, and at least partially accommodate a stopper structure (e.g., stoppers 329a and an elastic member 329b) to be described later.

Figure 7:
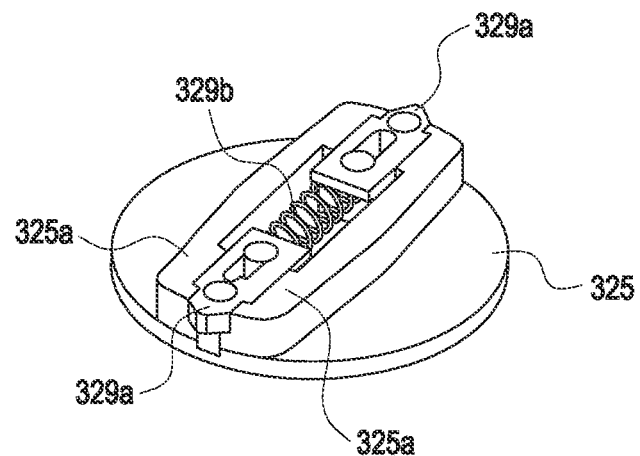
FIG. 7 is a diagram illustrating a second gear base of an adjusting part in a wearable electronic device according to various embodiments of the disclosure.
Figure 8:
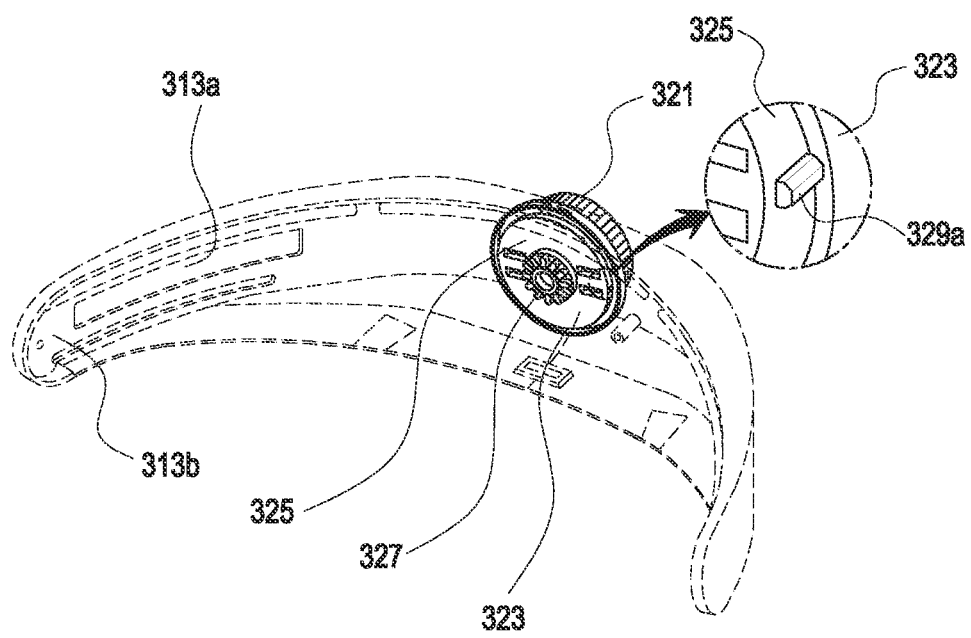
FIG. 8 is a diagram illustrating an adjusting part with a driving structure assembled therein in a wearable electronic device according to various embodiments of the disclosure.

FIG. 7 is a diagram illustrating the second gear base 325 in an adjusting part (e.g., the adjusting part 300 of FIG. 4) of a wearable electronic device (e.g., the wearable electronic device of FIG. 2) according to various embodiments of the disclosure. FIG. 8 is a diagram illustrating the adjusting part 300 with the driving structure 302 assembled therein in the wearable electronic device 200 according to various embodiments of the disclosure.

Referring further to FIGS. 7 and 8 together with FIG. 4, the second gear base 325 may be coupled with the first gear base 323, facing the first gear base 323, and include supporting ribs 325a corresponding to the accommodation groove 323a. The supporting ribs 325a may retrain the second gear base 325 to the first gear base 323 in a rotation direction, while in close contact with or supported by an inner wall of the accommodation groove 323a. According to an embodiment, the supporting ribs 325a may protrude from one surface of the second gear base 325 at spaced positions, and the stopper structure may be disposed between the supporting ribs 325a.

According to various embodiments, the stopper structure may include at least one stopper 329a linearly accommodated (e.g., linearly reciprocated) between the supporting ribs 325a, and the elastic member 329b providing an elastic force to the stopper 329a. In the illustrated embodiment, a pair of stoppers 329a may be disposed between the supporting ribs 325a, and the elastic member 329b may be disposed between the stoppers 329a to provide an elastic force in a direction to make the stoppers 329a recede from each other. As the stoppers 329a receive the elastic force from the elastic member 329b, the stoppers 329a may be disposed between the supporting ribs 325a, with their one ends protruding from edges of the second gear base 325. The stoppers 329a may move in a straight line according to the external force acting on the ends, so that the ends of the stoppers 329a may be infiltrated between the supporting ribs 325a.

According to various embodiments, the rotation gear 327 may include a spur gear formed on the other surface of the second gear base 325. As the second gear base 325 is coupled with the first gear base 323, the supporting ribs 325a and/or the stopper structure may be at least partially accommodated in the accommodation groove 323a, and the rotation gear 327 may rotate together with the rotary handle 321 (e.g., the rotary handle 231 of FIG. 2). In an embodiment, when the second gear base 325 is coupled with the first gear base 323, the ends of the stoppers 329a may be exposed to the outside of the first gear base 323 and the second gear base 325.

Figure 9:
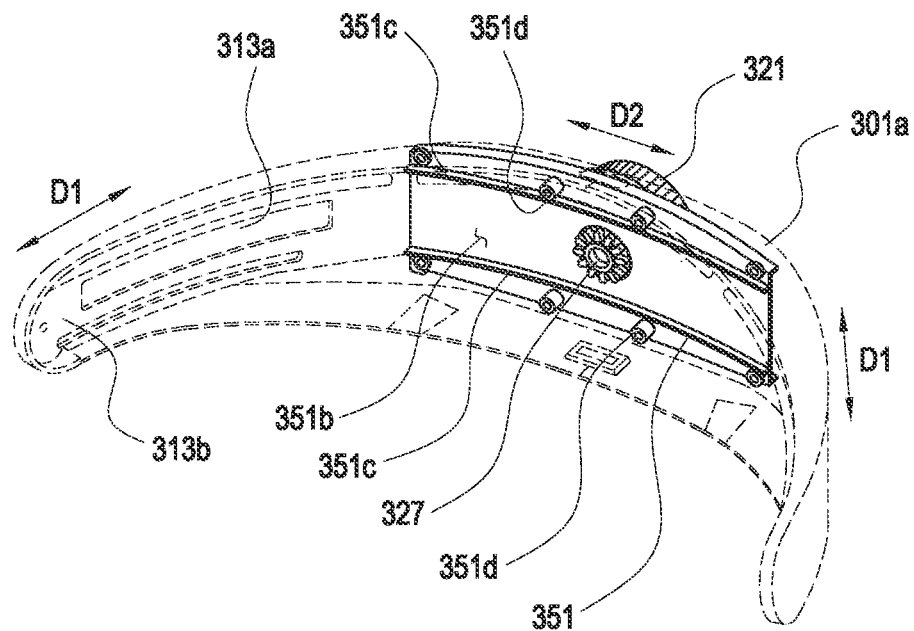
FIG. 9 is a diagram illustrating an adjusting part with a first holder member assembled therein in a wearable electronic device according to various embodiments of the disclosure.
Figure 10:
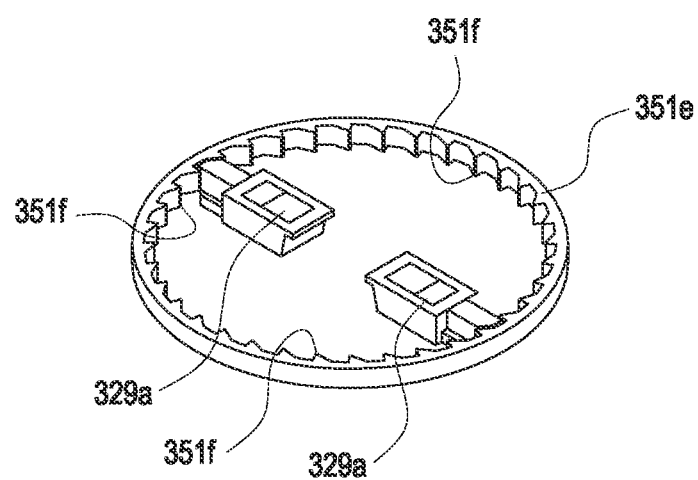
FIG. 10 is a diagram illustrating a stopper structure of an adjusting part in a wearable electronic device according to various embodiments of the disclosure.

According to various embodiments, the wearable electronic device 200 and/or the adjusting part 300 may further include at least one holder member 351 and 353. The at least one holder member 351 and 353 may include a first holder member 351 that supports the driving structure 302 in a rotatable state, and a second holder member 353 that supports or guides sliding movement of at least one (e.g., the second slide members 333) of the slide members 331 and 333. In an embodiment, the first holder member 351 may support or guide sliding movement of the slide members 331 and 333, together with the second holder member 353. In another embodiment, the stopper structure may further include an internal gear (e.g., an internal gear 351e of FIG. 10) formed in the first holder member 351. With further reference to FIGS. 9 and 10, an embodiment of the first holder member 351 will be described.

FIG. 9 is a diagram illustrating an adjusting part (e.g., the adjusting part 203 or 300 of FIG. 2 or FIG. 4) with the first holder member 351 assembled therein in a wearable electronic device (e.g., the wearable electronic device 200 of FIG. 2) according to various embodiments of the disclosure. FIG. 10 is a diagram illustrating the stopper structure of the adjusting part 300 in the wearable electronic device 200 according to various embodiments of the disclosure.

Referring further to FIGS. 9 and 10, the first holder member 351 may be coupled to face the case 301, for example, the inner surface of the first case member 301a to support the driving structure 302 in the rotatable state. For example, the driving structure 302 may rotate, with at least part thereof disposed between the inner surface of the case 301 and the first holder member 351. In an embodiment, the first holder member 351 may support or maintain the second gear base 325 coupled with the first gear base 323. For example, the second gear base 325 may be disposed to face one surface of the first holder member 351, and rotate substantially in slip contact with the first holder member 351. According to an embodiment, the first holder member 351 may include a rotation hole 351a, and the rotation gear 327 may be disposed to penetrate the first holder member 351 through the rotation hole 351a. For example, at least part of the rotation gear 327 may protrude from the other surface of the first holder member 351.

According to various embodiments, the first holder member 351 may be mounted in the first case member 301a, with the other surface thereof inclined to the first directions D1 and/or parallel to the second directions D2. The first holder member 351 may include a plurality of fastening bosses 351d and a pair of guide ribs 351c formed on the other surface thereof. As described later, the fastening bosses 351d may provide a mechanism to couple the second holder member 353 with the first holder member 351, and form or maintain a specified gap between the other surface of the first holder member 351 and the second holder member 353. The guide ribs 351c may be formed above and under the rotation hole 351a and/or the rotation gear 327, respectively and extend in the second directions D2 different from the first directions D1. In an embodiment, the slide members 331 and 333, for example, parts of the second slide members 333 may move in the second directions D2 in a space (e.g., a driving space 351b) between the guide ribs 351c.

According to various embodiments, the first holder member 351 may further include the internal gear 351e formed on one surface thereof. The internal gear 351e may protrude from the one surface of the first holder member 351 and accommodate the driving structure 302, for example, at least part of the second gear base 325. In an embodiment, teeth 351f of the internal gear 351e may be arranged along a circumferential direction of the internal gear 351e, and the inclined surface of each tooth 351f may be asymmetrical in shape. In another embodiment, the surface of each tooth 351f of the internal gear 351e may be symmetrical in shape. When the first holder member 351 is mounted on the first case member 301a, the ends of the stoppers 329a may substantially mesh between teeth 351f of the internal gear 351e. For example, the stopper structure may be substantially a combination of the stoppers 329a and the internal gear 351e, and the driving structure 302 may be maintained stationary without rotating anymore at a user-adjusted position. In another embodiment, because the sliding movement of the adjusting part 300 with respect to the wearing frames 202 is linked to the rotation of the driving structure 302, the driving structure 302 maintained stationary may restrict the sliding movement of the adjusting part 300 with respect to the wearing frames 202.

Figure 11:
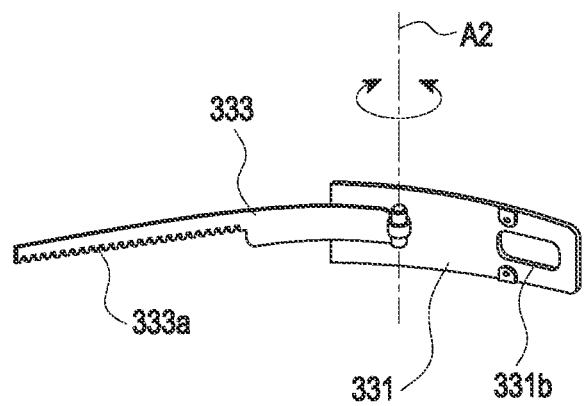
FIG. 11 is a diagram illustrating an arrangement structure of slide members in an adjusting part of a wearable electronic device according to various embodiments of the disclosure.
Figure 12:
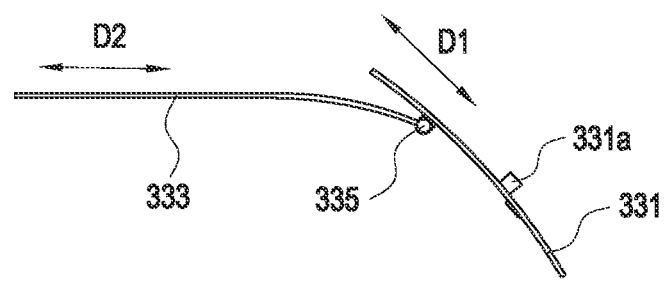
FIG. 12 is a diagram illustrating an arrangement structure of slide members in an adjusting part of a wearable electronic device according to various embodiments of the disclosure.

FIG. 11 is a diagram illustrating an arrangement structure of the slide members 331 and 333 in an adjusting part (e.g., the adjusting part 203 or 300 of FIG. 2 or FIG. 4) of a wearable electronic device (e.g. the wearable electronic device 200 of FIG. 2) according to various embodiments of the disclosure. FIG. 12 is a diagram illustrating the arrangement structure of the slide members 331 and 333 in the adjusting part 300 of the wearable electronic device 200 according to various embodiments of the disclosure.

Referring further to FIGS. 11 and 12 together with FIG. 4, slide members 331 and 333 may be disposed to be symmetrical in the case 301, and include a first slide member 331 and a second slide member 333. The wearable electronic device 200 and/or the adjusting part 300 may include at least one first slide boss 331a formed in the first slide member 331 and a first wiring hole 331b. The first slide boss 331a may protrude from one surface of the first slide member 331 and be accommodated in a first slide hole 313a. For example, the first slide boss 331a may move along the first directions D1 inside the first slide hole 313a. According to an embodiment, the first wiring hole 331b may be formed to penetrate the first slide member 331 at a position adjacent to the first slide boss 331a. For example, the first slide boss 331a and the first wiring hole 331b may be disposed adjacent to each other and arranged substantially along the first directions D1.

According to various embodiments, one end of the second slide member 333 may be rotatably coupled with the other surface of the first slide member 331 by a pivot pin 335. For example, the second slide member 333 may be coupled with the first slide member 331 to rotate around a rotation axis A2. In an embodiment, the one end of the second slide member 333 may be coupled at any position between both ends of the first slide member 331. In some embodiments, the coupling position of the second slide member 333 may be between one end of the first slide member 331 and the first wiring hole 331b. In another embodiment, the second slide member 333 may include a rack gear 333a including a plurality of teeth arranged along one direction, for example, the second directions D2, from the other end thereof. The rack gear 333a may mesh with the rotation gear 327 on the other surface of the first holder member 351 to convert the rotation of the driving structure 302, for example, the rotary handle 321 into the sliding movement of the second slide member 333.

Figure 13:
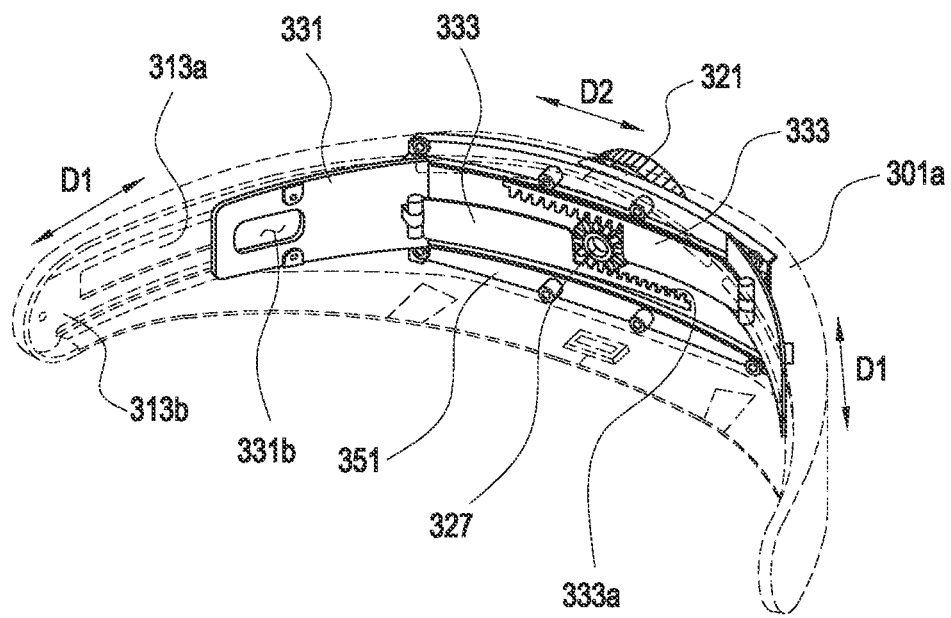
FIG. 13 is a diagram illustrating an adjusting part with slide members assembled therein in a wearable electronic device according to various embodiments of the disclosure.
Figure 14:
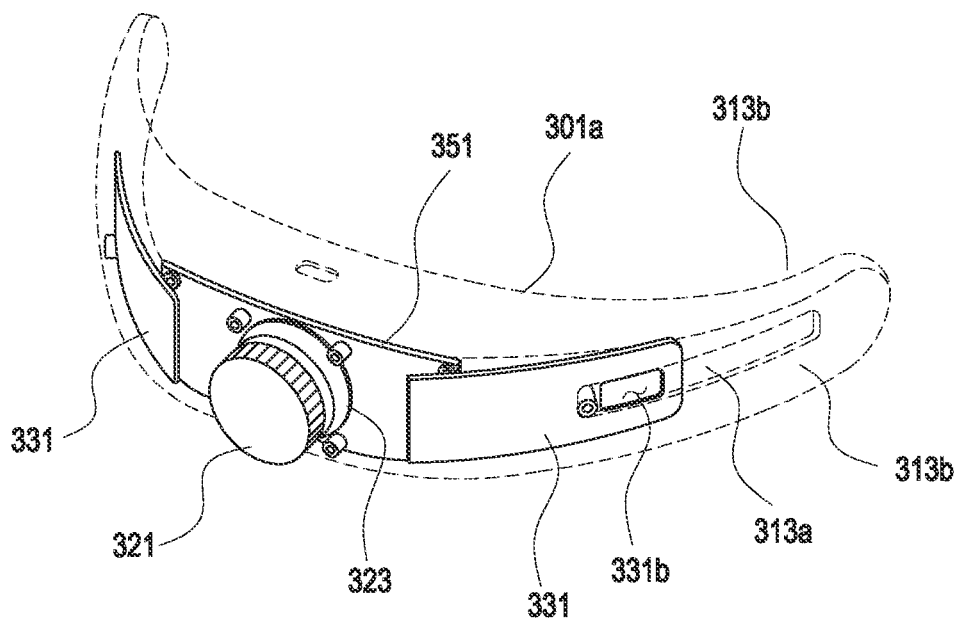
FIG. 14 is a diagram illustrating an adjusting part with slide members assembled therein in a wearable electronic device according to various embodiments of the disclosure, as viewed from a different direction.

With further reference to FIGS. 13 and 14, a structure in which the slide members 331 and 333 are assembled to the case 301, for example, the first case member 301a will be described.

FIG. 13 is a diagram illustrating an adjusting part (e.g., the adjusting part 203 or 300 of FIG. 2 or FIG. 4) with the slide members 331 and 333 assembled therein in a wearable electronic device (e.g., the wearable electronic device 200 of FIG. 2) according to various embodiments of the disclosure. FIG. 14 is a diagram illustrating the adjusting part 300 with the slide members 331 and 333 assembled therein in the wearable electronic device 200 according to various embodiments of the disclosure, as viewed from a different direction.

Referring further to FIGS. 13 and 14, the first slide members 331 may be slidably coupled with the inner surface of the first case member 301a, and the second slide members 333 may be slidably accommodated in the first holder members 351, for example, the driving space 351b. The rack gears 333a may mesh with the rotation gear 327 in the driving space 351b. For example, as the driving structure 302 (e.g., the rotation gear 327) rotates, the rack gears 333a may move in the second directions D2 within the driving space 351b. When the first slide members 331 are disposed on the inner surface of the first case member 301a, the first slide bosses 331a may be located substantially in the first slide holes 313a. At a position illustrated in FIG. 13 and/or FIG. 14, the first slide bosses 331a may interfere with the inner walls of one ends of the first slide holes 313a, and the first wiring holes 331b may be located to substantially overlap with parts of the first slide holes 313a. As described later with reference to FIG. 18, when the adjusting part 300 slides so that the first slide bosses 331a are located adjacent to the other ends of the first slide holes 313a, the first slide members 331 may interfere with an internal structure of the first case member 301a. For example, even though the first slide bosses 331a are located adjacent to the other ends of the first slide holes 313a, the first wiring holes 331b may at least partially overlap with other parts of the first slide holes 313a. While the first slide members 331 move between positions illustrated in FIGS. 14 and 18, the first wiring holes 331b may substantially overlap with parts of the first slide holes 313a. As such, the first wiring holes 331b may be located to at least partially overlap with the first slide holes 313a, within a slidable range of the first slide members 331.

Figure 15:
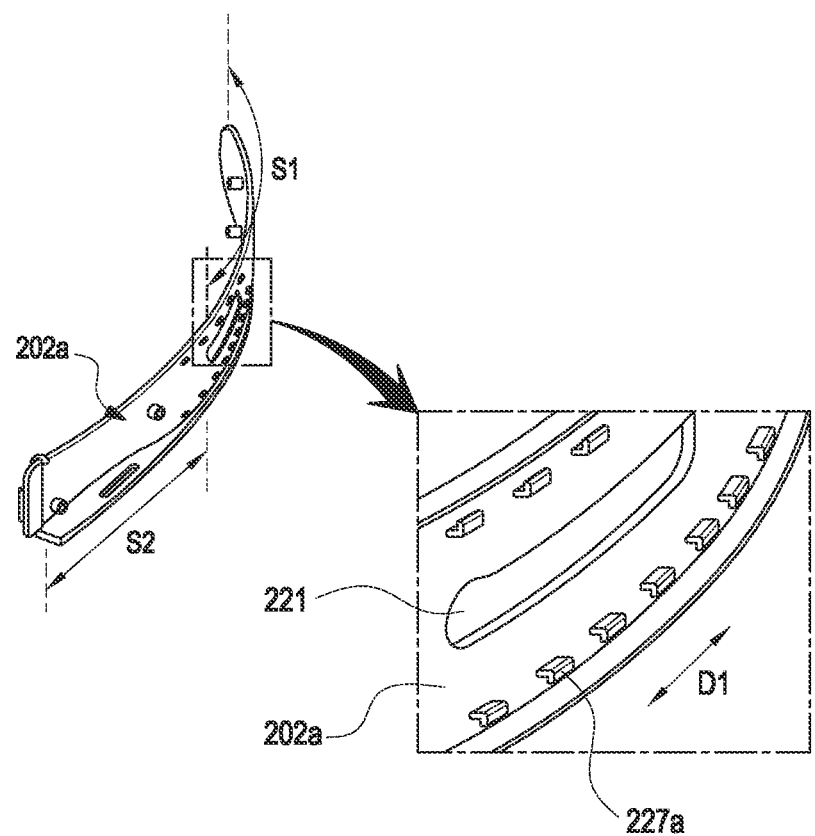
FIG. 15 is a diagram illustrating a wearing frame in a wearable electronic device according to various embodiments of the disclosure.
Figure 16:
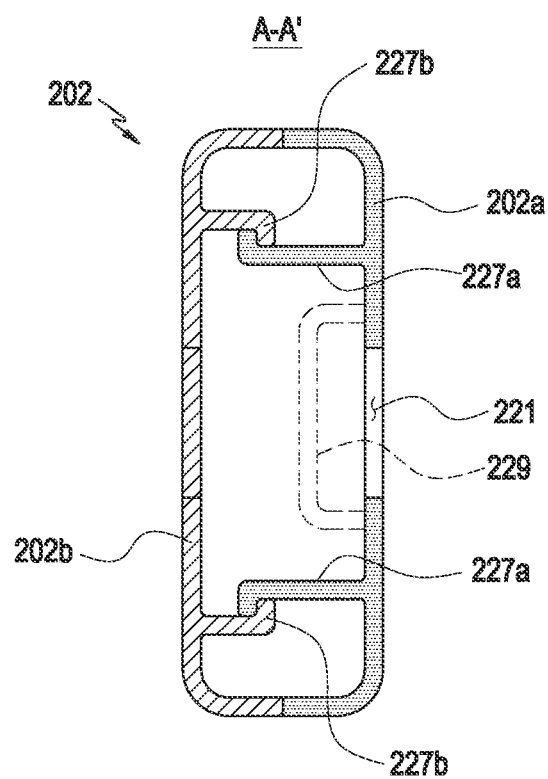
FIG. 16 is a cross-sectional view illustrating the wearing frame, taken along line A-A' of FIG. 4 according to various embodiments of the disclosure.

FIG. 15 is a diagram illustrating a wearing frame 202 (e.g., an inner frame 202a) in a wearable electronic device (e.g., the wearable electronic device 200 of FIG. 2) according to various embodiments of the disclosure. FIG. 16 is a cross-sectional view illustrating the wearing frame 202, taken along line A-A' of FIG. 4 according to various embodiments of the disclosure.

Referring to FIGS. 15 and 16 together with FIG. 4, the wearing frame 202 may include an inner frame 202a and an outer frame 202b and form a space in which a wiring structure (e.g., a wiring 363 of FIG. 20 or FIG. 21) is accommodated. The wearing frame 202 may further include a second slide hole 221, a second wiring hole 223, and/or at least one guide boss 225 formed on the inner frame 202a. The second slide hole 221 may extend substantially along the first directions D1 and be formed in an area in which the second slide hole 221 comes into slip contact with the adjusting part 300 according to sliding movement of the adjusting part 300, for example, within the first segment S1. In an embodiment, the second slide hole 221 may be formed to penetrate the inner frame 202a, and the wearing frame 202 may further include a cover part 229 formed in correspondence with the second slide hole 221. For example, the cover part 229 may be formed on the inner surface of the inner frame 202a to form a space in a specified shape together with the inner surface of the inner frame 202a, and prevent visual exposure of the internal space of the wearing frame 202 to the outside.

According to various embodiments, the second wiring hole 223 may be formed to penetrate the inner frame 202a and disposed parallel to the second slide hole 221 along the first directions D1. In an embodiment, the guide boss 225 may protrude from the inner frame 202a above and/or under the second wiring hole 223. For example, the guide boss 225 may be slidably accommodated in the guide hole 313b of the first case member 301a. In some embodiments, the guide boss 225 may be formed on the first slide member 331 rather than on the wearing frame 202. In another embodiment, guide bosses 225 may be formed on the wearing frame 202 and the first slide member 331, respectively.

According to various embodiments, the wearable electronic device 200 and/or the wearable frame 202 may include first hook(s) 227a and second hook(s) 227b to fasten the inner frame 202a and the outer frame 202b to each other. Parts (e.g., the second segment S2) of the inner frame 202a and the outer frame 202b may be coupled with each other by a fastening element such as a screw, and the other parts (e.g., the first segment S1) thereof may be coupled with each other by the first hook(s) 227a and the second hook(s) 227b. As described before, as the wearing frame 202 and the adjusting part 300 slide with respect to each other, the curvature of the first segment S1 may change, and the change in the curvature may be brought by a relative displacement or relative reducing/extension between the inner frame 202a and the outer frame 202b. The first hook(s) 227a and the second hook(s) 227b may maintain the inner frame 202a and the outer frame 202b fastened to each other, while allowing a change in the curvature of the first segment S1.

According to various embodiments, in the first segment S1, a plurality of first hooks 227a may be disposed on the inner surface of the inner frame 202a along the first directions D1, and a plurality of second hooks 227b may be disposed on the inner surface of the outer frame 202b along the first directions D1. For example, each of the first hooks 227a may be engaged with one of the second hooks 227b to fasten the inner frame 202a and the outer frame 202b to each other. In an embodiment, the first hooks 227a may be disposed above and under the second slide hole 221. In another embodiment, the first hooks 227a and the second hooks 227b may move with respect to each other in the first directions D1. For example, a relative movement or relative reduction/expansion between the inner frame 202a and the outer frame 202b may be allowed.

According to various embodiments, the first hooks 227a and the second hooks 227b may extend along the first directions D1 by a specified length. The extended length of the first hooks 227a and the second hooks 227b along the first directions D1 may be greater than a relative movement distance or a relative reduced/extended size between the inner frame 202a and the outer frame 202b. For example, even though the outer frame 202b is moved or deformed with respect to the inner frame 202a, the first hooks 227a may be maintained engaged with the second hooks 227b. According to an embodiment, the first hooks 227a may be arranged at intervals greater than the relative movement distance or relative reduction/extension size between the inner frame 202a and the outer frame 220b. For example, even though the outer frame 202b is moved or deformed with respect to the inner frame 202a, the first hooks 227a may not interfere with second hooks 227b other than currently coupled second hooks 227b.

Figure 17:
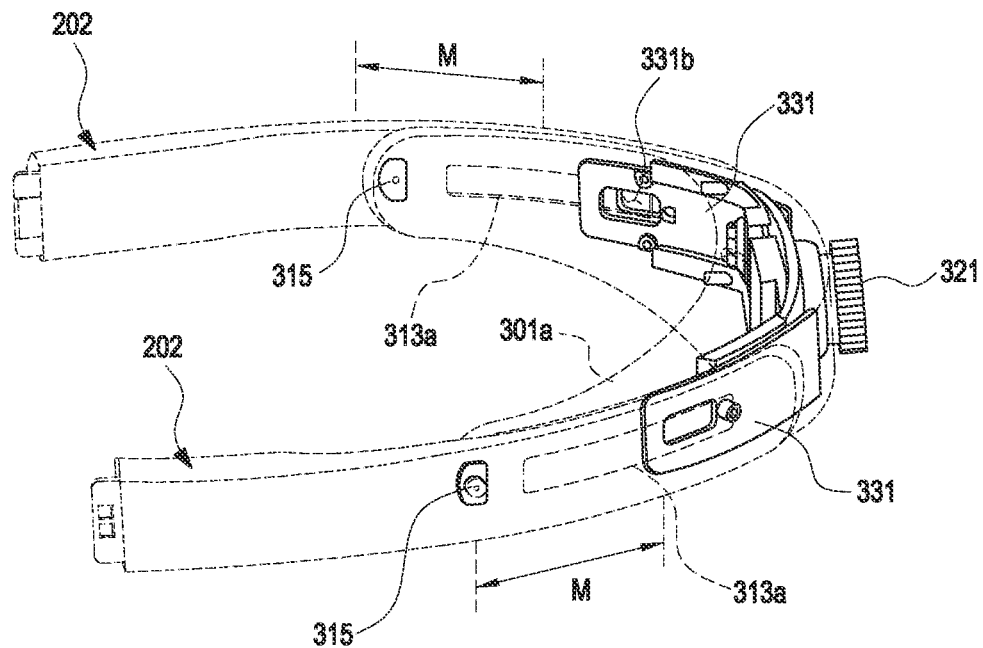
FIG. 17 is a diagram illustrating an adjusting part assembled to wearing frames in a wearable electronic device according to various embodiments of the disclosure.
Figure 18:
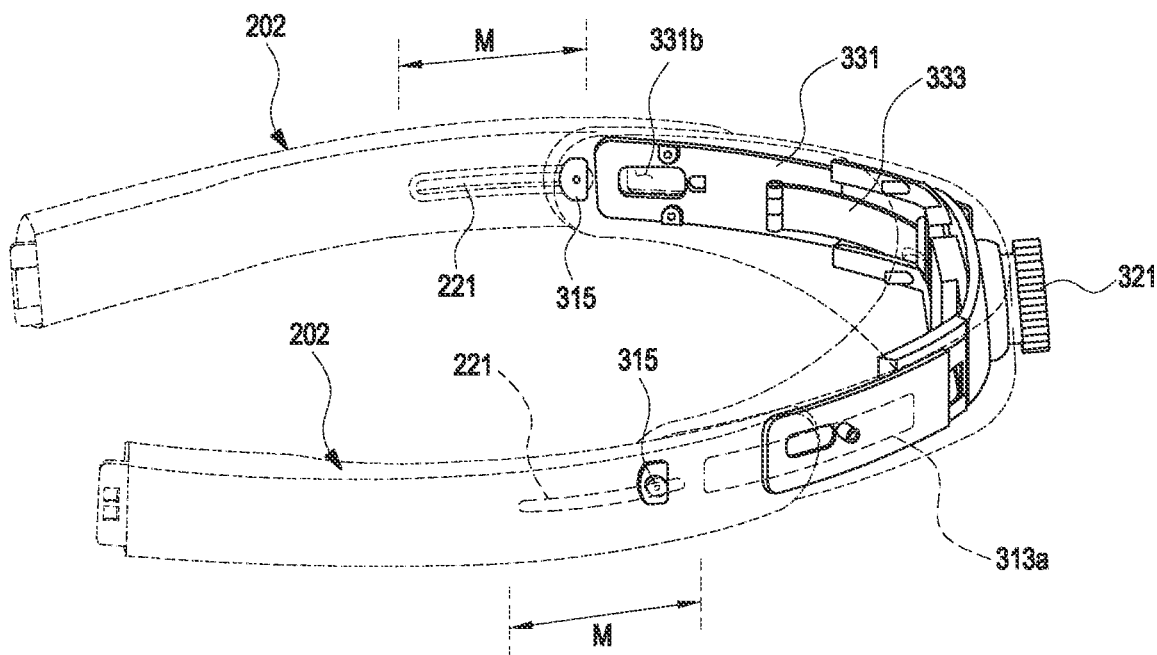
FIG. 18 is a diagram illustrating a sliding movement of an adjusting part with respect to wearing frames in a wearable electronic device according to various embodiments of the disclosure.

FIG. 17 is a diagram illustrating an adjusting part (e.g., the adjusting part 203 or 300 of FIG. 2 or FIG. 4) assembled to the wearing frames 202 in a wearable electronic device (e.g., the wearable electronic device 200 of FIG. 2) according to various embodiments of the disclosure. FIG. 18 is a diagram illustrating sliding movement of the adjusting part 300 with respect to the wearing frames 202 in the wearable electronic device 200 according to various embodiments of the disclosure.

Referring further to FIGS. 17 and 18, the wearing frames 202 may be coupled with the adjusting part 300 in slip contact with the outer surface of the first case member 301a, for example. In an embodiment, a first slide boss 331a may be fastened to one of the wearing frames 202, while being located in a first slide hole 313a. For example, the wearing frames 202 and the first slide members 331 may be coupled with each other through the first slide holes 313a, with part of the first case member 301a interposed therebetween. According to some embodiments, the wearable electronic device 200 and/or the adjusting part 300 may further include second slide bosses 315 corresponding to the second slide holes 221. The second slide bosses 315 may be disposed on the first case member 301a at both ends of the adjusting part 300, respectively. In another embodiment, the second slide bosses 315 may be integrally formed with the first case member 301a. In another embodiment, as the second slide bosses 315 are slidably accommodated in the wearing frames 202, for example, the second slide holes 221, the second slide bosses 315 may bind the wearing frames 202 to the adjusting part 300 in a slide-movable state.

According to various embodiments, parts of the wearing frames 202 between the first slide bosses 331a and the second slide bosses 315 may be brought into close contact with the outer surface of the adjusting part 300, for example, the outer surface of the first case member 301a. For example, the first slide bosses 331a and/or the second slide bosses 315 may couple the wearing frames 202 with the adjusting part 300, guide sliding movement of the adjusting part 300 with respect to the wearing frames 202, and/or maintain the wearing frames 202 and the adjusting part 300 in close contact.

According to various embodiments, when the wearing frame(s) 202 is coupled with the adjusting part 300, for example, the first case member 301a, the second wiring hole 223 may be disposed to substantially face the first wiring hole 331b. For example, the internal space of the wearing frame 202(s) and the internal space of the first case member 301a may be connected through the first wiring hole 331b and the second wiring hole 223. In some embodiments, the first wiring hole 331b and/or the second wiring hole 223 may be substantially at least partially connected to the first slide hole 313a. For example, even though the wearing frame(s) 202 and the adjusting part 300 slide with respect to each other, the internal space of the wearing frame(s) 202 and the internal space of the first case member 301a may be connected through the first wiring hole 331b, the second wiring hole 223, and/or the first slide hole 313a.

According to various embodiments, at first positions illustrated in FIG. 17, the first slide holes 313a may be substantially concealed by the wearing frames 202. For example, at the first position, the first slide holes 313a may not be visually exposed to the outside. The "first positions" may refer to, for example, one end of movement section M in which the adjusting part 300 slides with respect to the wearing frames 202. According to an embodiment, at second positions illustrated in FIG. 18, the wearing frames 202 may slide with respect to the adjusting part 300 so that the first slide holes 313a are exposed to the outside. The "second positions" may refer to, for example, the other end of the movement section M in which the adjusting part 300 slides with respect to the wearing frames 202. For example, the adjusting part 300 may slide between the first positions and the second positions with respect to the wearing frames 202. When the wearing frames 202 are at the second positions, the first slide holes 313a may be substantially closed by the first slide members 331.

Figure 19:
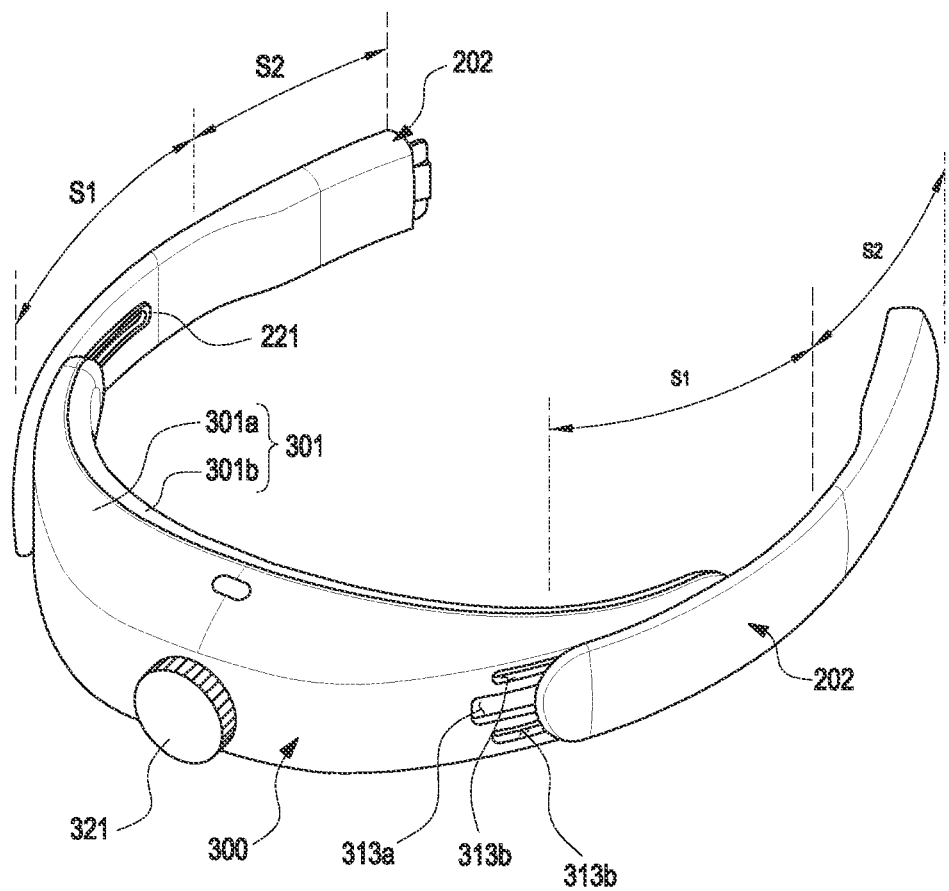
FIG. 19 is a diagram illustrating a sliding movement of an adjusting part in a wearable electronic device according to various embodiments of the disclosure.

FIG. 19 is diagram illustrating sliding movement of an adjusting part (e.g., the adjusting part 300 of FIG. 4) in a wearable electronic device (e.g., the wearable electronic device 200 of FIG. 2) according to various embodiments of the disclosure.

Referring further to FIG. 19, when the adjusting part 300 slides between the first and second positions with respect to the wearing frames 202, parts of the first slide holes 313a may be concealed by the wearing frames 202, and the other parts thereof may be closed substantially by the first slide members 331. In another embodiment, similarly to the first slide holes 313a, parts of the guide holes 313b may be concealed by the wearing frames 202, and the other parts of the guide holes 313b may be concealed by the first slide members 331. Parts of the wearing frames 202, for example, the first segments S1 may come into slip contact with the adjusting part 300, and parts of the first segments S1 contacting the adjusting part 300 and parts of the first segment S1 not contacting the adjusting part 300 may have different shapes, for example, different curvatures. In some embodiments, the first segments S1 may have a higher flexibility than the second segments S2, and when the curvature of the first segments S1 changes, a relative displacement or relative reduction/extension may occur between the inner frame 202a and the outer frame 202b.

Figure 20:
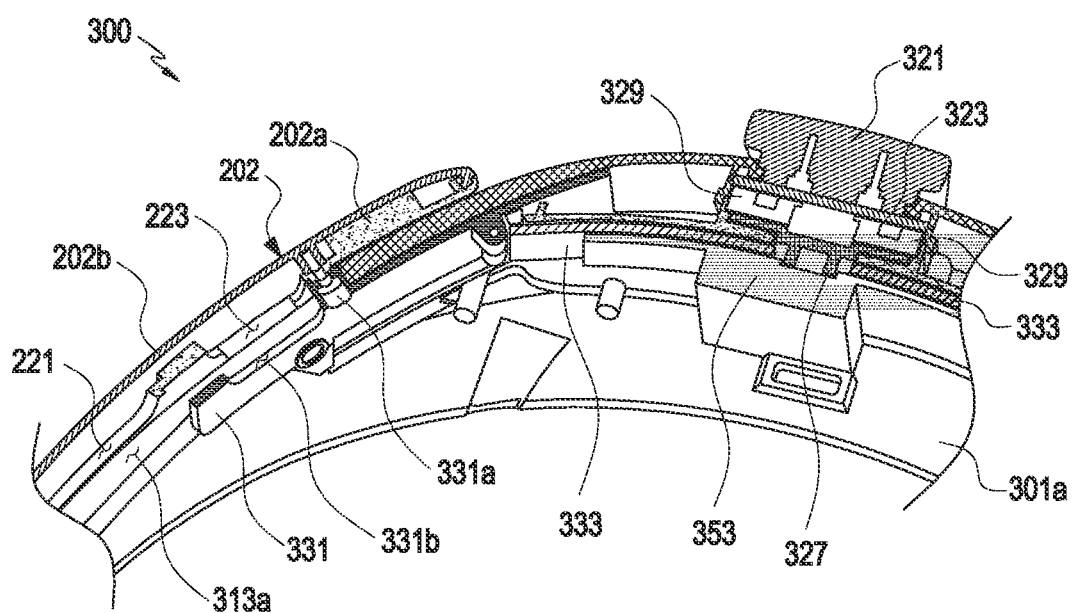
FIG. 20 is a diagram illustrating a cut-away adjusting part in a wearable electronic device according to various embodiments of the disclosure.

FIG. 20 is a diagram illustrating a cut-away adjusting part (e.g., the adjusting part 203 or 300 of FIG. 2 or FIG. 4) in a wearable electronic device (e.g., the wearable electronic device 200 of FIG. 2) according to various embodiments of the disclosure.

Referring further to FIG. 20 together with FIG. 4, the second holder member 353 may be coupled with the first holder member 351 to face the first holder member 351. Fastening bosses and guide ribs (e.g., the fastening bosses 351d and the guide ribs 351c of FIG. 9) may maintain a predetermined gap between the second holder member 353 and the first holder member 351. The second slide members 333 may be at least partially slidably accommodated between the first holder member 351 and the second holder member 353, for example, in the driving space 351b of FIG. 9. The rack gear 333a of one of the second slide members 333 may mesh with the rotation gear 327 from under the rotation gear 327, and the rack gear 333a of the other second slide member 333 may mesh with the rotation gear 327 from above the rotation gear 327. According to an embodiment, the second holder member 353 may restrain the second slide members 333 within the driving space 351b so that the rack gears 333a and the rotation gear 327 are maintained meshed.

According to various embodiments, the second slide members 333 may be maintained in a specified shape between the first holder member 351 and the second holder member 353. However, parts of the first holder member 351 and the second holder member 351 outside the space between the first holder member 351 and the second holder member 353 may be deformed out of the specified shape. The "specified shape" may refer to a shape substantially defined by the driving space 351b, and include a planar shape or a curved shape. Parts of the second slide members 333 outside the space between the first holder member 351 and the second holder member 353 may be in a planar shape while inclined to parts of the specified shape. For example, part of a second slide member 333 between the first holder member 351 (and/or the second holder member 353) and a pivot pin 335 may be disposed inclined to the driving space 351b while being shaped into a straight line or a flat surface.

FIG. 20 is a diagram illustrating the cut-away adjusting part 300, for example, at the position illustrated in FIG. 17 according to various embodiments of the disclosure. It may be noted that at the first positions, the first slide bosses 331a may contact the inner walls of one ends of the first slide holes 313a, and the first wiring holes 331b and the second wiring holes 223 are located to substantially face each other. Because the first wiring holes 331b and/or the second wiring holes 223 are located to at least partially overlap with the first slide holes 313a, the internal spaces of the wearing frames 202 may be connected to the internal space of the adjusting part 300, for example, the internal space of the first case member 301a.

Figure 21:
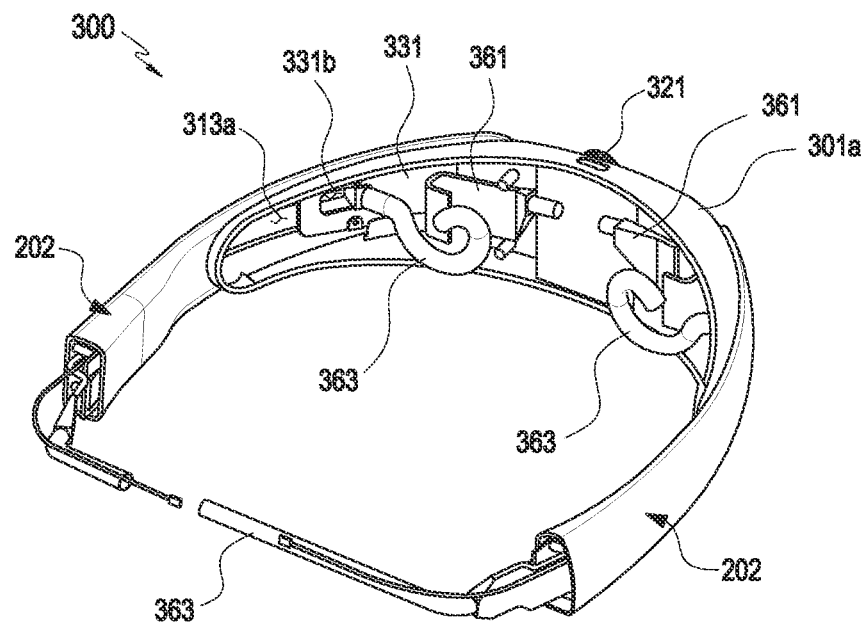
FIG. 21 is a diagram illustrating a wiring structure in a wearable electronic device according to various embodiments of the disclosure.
Figure 22:
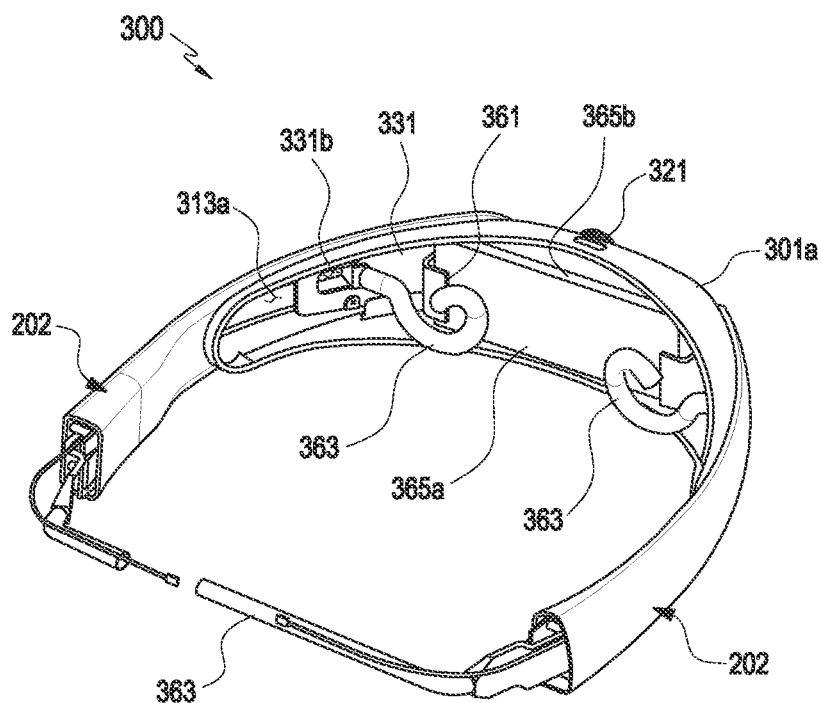
FIG. 22 is a diagram illustrating electronic component(s) arranged in a wearable electronic device according to various embodiments of the disclosure.

FIG. 21 is a diagram illustrating a wiring structure in a wearable electronic device (e.g., the wearable electronic device 200 of FIG. 2) according to various embodiments of the disclosure. FIG. 22 is a diagram illustrating arrangement of electronic component(s) (e.g., the circuit board 365a and/or the battery 365b) in the wearable electronic device 200 according to various embodiments of the disclosure.

Referring further to FIGS. 21 and 22, a first wiring hole 331b, a second wiring hole 223, and/or a first slide holes 313a may provide a passage leading from the internal space of the adjusting part 300 to a display part (e.g., the display part 201 of FIG. 2 or FIG. 3) via the wearing frame(s) 202. For example, a wiring path running from the adjusting part 300 (e.g., the adjusting part 203 of FIG. 2 or FIG. 3) to the display part 201 may be formed through the first wiring hole 331b, the second wiring hole 223, and/or the first slide hole 313a, and a wiring 363 (e.g., a cable or a flexible printed circuit board) may be at least partially disposed in the internal space of the wearing frame(s) 202, without being exposed to the outside. In an embodiment, the wiring 363 may be disposed from the internal space of the adjusting part 300 to the internal space of the display part 201 through the internal space of the wearing frame 202. For example, the wiring 363 may electrically connect an electric item (e.g., the circuit board 365a and/or the battery 365b) in the adjusting part 300 to an electric item (e.g., a projector, a flat display panel, and/or camera module) in the display part 201.

According to various embodiments, at the first positions of FIG. 17, the wirings 363 may be maintained curved at least partially at a first curvature in the internal space of the adjusting part 300. At the second positions of FIG. 18, rolled parts of the wirings 363 may be maintained curved at a second curvature smaller than the first curvature. For example, the wirings 363 may be at least partially rolled or curved in the internal space of the adjusting part 300, and deformed similar to a straight line at the second positions than at the first positions.

According to various embodiments, the adjusting part 300 (e.g., the adjusting part 203 of FIG. 2 or FIG. 3) may include at least one support structure 361, and the support structure 361 may prevent an electronic component (e.g., the circuit board 365a and/or the battery 365b) from interfering with another mechanical structure, while mounting or fixing the electronic component in the internal space of the adjusting part 300. In some embodiments, the wearing frame(s) 202 may be disposed such that the wearing frame(s) 202 accommodated inside the adjusting part 300 is drawn out from the adjusting part 300. In the above-described embodiments, the wearing frame(s) 202 is structured so as to come into slip contact with the outer surface of the adjusting part 300, and a space for accommodating the circuit board 365a or the battery 365b may be secured in the adjusting part 300.

According to various embodiments, the wirings 363, for example, cables or flexible printed circuit boards are not visually exposed to the outside. For example, as the wirings 363 are accommodated inside the display part 201, the wearing frames 202, and/or the adjusting part 203 or 300, the appearance of the wearable electronic device 200 may be sophisticated. Even though electronic components such as a projector, a flat display panel, a camera module, various sensors, a circuit board, and/or a battery are arranged (e.g., distributed) at appropriate positions in the wearable electronic device 200, the electronic components may be easily connected to each other by using the wirings 363 (e.g., cables or flexible printed circuit boards). For example, an input module or an output module, such as a projector or a camera module, may be disposed in the display part 201, and an electronic component such as the circuit board 365a and/or the battery 365b may be disposed in the adjusting part 203 or 300. As the electronic components are distributed to the display part 201 or the adjusting part 203 or 300, a load applied to the user's body by the weight of the wearable electronic device 200 in the worn state may be distributed. For example, various embodiments of the disclosure may provide an environment in which the user's fatigue may be alleviated, and the wearable electronic device 200 may be comfortably used in the worn state. According to an embodiment, the wearing frames 202 may be coupled with the first slide members 331 through the first slide holes 313a, and the wearing frames 202 and the first slide members 331 may be combined to conceal or close the first slide holes 313a. For example, visual exposure of the internal space of the adjusting part 203 or 300 to the outside may be prevented. In another embodiment, the exterior of the wearable electronic device 200 may be easily designed such that the shape, size, color or material of the wearable frame 202 is harmonized with the appearance of the display part 201 and/or the adjusting part 203 or 300. In another embodiment, the wearing frames 202 may be maintained in close contact with the adjusting part 203 or 300 by allowing a relative displacement or relative reduction/extension between the inner frames 202a and the outer frames 202b in some segment, for example, the first segment S1 that comes into slip contact with the adjusting part 203 or 300.

According to various embodiments of the disclosure, a wearable electronic device (e.g., the electronic device 101, 102 or 104 of FIG. 1 or the wearable electronic device 200 of FIG. 2) may include a display part (e.g., the display 201 of FIG. 2), a pair of wearing frames (e.g., the wearing frames 202 of FIG. 2 or FIG. 4) extending from the display part, and an adjusting part (e.g., the adjusting part 203 or 300 of FIG. 2 or FIG. 4) slidably coupled with the wearing frames. The adjusting part may include a case (e.g., the case 301 or the first case member 301a of FIG. 4) including first slide holes (e.g., the first slide holes 313a of FIG. 4) extending in a first direction (e.g., the first directions D1 of FIG. 2 or FIG. 12), first slide members (e.g., the first slide members 331 of FIG. 4 or FIG. 19) slidably disposed inside the case and coupled with one of the wearing frames through one of the first slide holes, second slide members (e.g., the second slide members 333 of FIG. 4 or FIG. 19) pivotably coupled with the first slide members, respectively, and a driving structure (e.g., the rotary handle 231 of FIG. 2 or the driving structure 302 of FIG. 4) rotatably mounted in the case. The second slide members may be configured to, along with rotation of the driving structure, slide the first slide members in the first direction, while moving in a second direction (e.g., the second directions D2 of FIG. 12 or FIG. 13) different from the first direction.

According to various embodiments, the wearing frames may be configured to come into slip contact with an outer surface of the case, along with the sliding movement of the first slide members.

According to various embodiments, the wearing frames may have a higher flexibility at a part in slip contact with the case than at a remaining part.

According to various embodiments, the adjusting part may further include at least one first slide boss (e.g., the first slide bosses 331a of FIG. 4 or FIG. 19) formed on the first slide members, and the first slide boss may be located in a first slide hole and fastened to one of the wearing frames.

According to various embodiments, the wearable electronic device may further include first wiring holes (e.g., the first wiring holes 331b of FIG. 4 or FIG. 19) formed on the first slide members, and second wiring holes (e.g., the first wiring holes 331b of FIG. 4 or FIG. 19) formed on the wearing frames and disposed to face the first wiring holes. The first wiring holes and the second wiring holes may be disposed to at least partially overlap with the first slide holes.

According to various embodiments, the wearable electronic device may further include at least one electronic component (e.g., the circuit board 365a and/or the battery 365b of FIG. 21) disposed in the case, and a cable or a flexible printed circuit board (e.g., the wirings 363 of FIG. 20 or FIG. 21) connected to the electronic component, and the cable or the flexible printed circuit board may be wired into one of the wearing frames through a first wiring hole, a first slide hole, and a second wiring hole.

According to various embodiments, the electronic component may include at least one of a circuit board or a battery.

According to various embodiments, the driving structure may include a rotation gear (e.g., the rotation gear 327 of FIG. 4 or FIG. 19) rotatably mounted in the case, and a rotary handle (e.g., the rotary handle 231 or 321 of FIG. 2, 4 or 19) disposed on an outer surface of the case and configured to rotate together with the rotation gear, and the second slide members may be configured to slide in the second direction along with the rotation of the rotation gear by including rack gears (e.g., the rack gears 333a of FIG. 3 or FIG. 11) meshing with the rotation gear.

According to various embodiments, the driving structure may further include a first gear base (e.g., the first gear base 323 of FIG. 4 or FIG. 6) rotatably disposed on an inner surface of the case and mounted on or fixed to the rotary handle, and a second gear base (e.g., the second gear base 325 of FIG. 4 or FIG. 7) coupled with the first gear base to face the first gear base, and the rotation gear may be formed on the second gear base.

According to various embodiments, the adjusting part may further include a first holder member (e.g., the first holder member 351 of FIG. 4 or FIG. 19) mounted to face the inner surface of the case, with at least part of the driving structure in between. The second gear base may be disposed to face one surface of the first holder member, and the rotation gear may be disposed to penetrate the first holder member and configured to mesh with the rack gears on the other surface of the first holder member.

According to various embodiments, the adjusting part may further include a second holder member (e.g., the second holder member 353 of FIG. 4 or FIG. 19) coupled with the first holder member to face the first holder member, and at least parts of the second slide members may be slidably disposed between the first holder member and the second holder member.

According to various embodiments, the wearable electronic device may further include second slide holes (e.g., the second slide holes 221 of FIG. 4, 15 or 16) formed on the wearing frames, and at least one second slide boss (e.g., the second slide bosses 315 of FIG. 14, 17 or 18) disposed on the case. The second slide boss may be configured to slide inside a second slide hole along with the sliding movement of the first slide members.

According to various embodiments, the wearing frames may be configured to at least partially conceal the first slide holes, at a first position (e.g., the positions illustrated in FIG. 17), and the first slide members may be configured to at least partially close the first slide holes, at a second position (e.g., the positions illustrated in FIG. 18) different from the first position.

According to various embodiments of the disclosure, a wearable electronic device may include a display part, a pair of wearing frames extending from the display part, a cable or a flexible printed circuit board electrically connected to the display part and an adjusting part slidably coupled with the wearing frames. The adjusting part may include a case including first slide holes extending in a first direction, first slide members slidably disposed inside the case and coupled with one of the wearing frames through one of the first slide holes, second slide members pivotably coupled with the first slide members, respectively, and a driving structure rotatably mounted in the case and configured to slide the second slide members in a second direction different from the first direction. The circuit board or the flexible printed circuit board may be wired from inside the wearing frames into the case by penetrating the wearing frames and the first slide members.

According to various embodiments, the wearable electronic device may further include first wiring holes formed on the first slide members, and second wiring holes formed on the wearing frames and disposed to face the first wiring holes. The first wiring holes and the second wiring holes may be disposed to at least partially overlap with the first slide holes.

According to various embodiments, the cable or the flexible printed circuit board may be disposed from inside the wearing frames into the case through the first wiring holes, the first slide holes, and the second wiring holes.

According to various embodiments, between a first position being one end of a sliding movement segment (hereinafter, 'movement segment') of the adjusting part (e.g., the movement segments M of FIG. 17 or FIG. 18) and a second position (e.g., the position illustrated in FIG. 22) being the other end of the movement segment, parts of the first slide holes may be configured to be concealed by the wearing frames, and other parts of the first slide holes may be configured to be closed by the first slide members.

According to various embodiments, the adjusting part may further include at least one first slide boss formed on the first slide members, and the first slide boss may be located in a first slide hole and fastened to one of the wearing frames.

According to various embodiments, the wearable electronic device may further include second slide holes formed on the wearing frames, and at least one second slide boss disposed on the case. The second slide boss may be configured to slide inside a second slide hole along with the sliding movement of the first slide members.

According to various embodiments, the wearable electronic device may further include a circuit board or a battery disposed inside the case, and the circuit board or the battery may be electrically connected to the display part through the cable or the flexible printed circuit board.

According to various embodiments of the disclosure, as a wearing frame and an adjusting part for adjusting a wearing state are coupled slidably, a user may adjust the wearing state of a wearable electronic device according to the user's convenience. The adjusting part may provide a space in which electronic components (e.g., a display, a circuit board, and/or a battery) may be disposed. For example, the adjusting part may prevent the load of the wearable electronic device from being concentrated on the user's specific body part and improve wearability by providing an environment in which the weight of the wearable electronic device may be appropriately distributed. In an embodiment, the wearing frame may accommodate a wiring (e.g., a cable or a flexible printed circuit board) connecting the adjusting part and a display part to each other. For example, outward exposure of the cable or the flexible printed circuit board may be prevented, thereby making the wearable electronic device look sophisticated.

While the disclosure has been particularly shown and described with reference to embodiments thereof, it will be understood that various changes in form and details may be made therein without departing from the spirit and scope of the following claims.

What is claimed is:

1. A wearable electronic device comprising:
a display part;
wearing frames extending from the display part; and
an adjusting part slidably coupled with the wearing frames,
wherein the adjusting part comprises:
a case comprising first slide holes extending in a first direction;
first slide members provided inside the case and coupled with one of the wearing frames through one of the first slide holes;
second slide members rotatably coupled with the first slide members, respectively; and
a driving structure provided in the case, and
wherein, with rotation of the driving structure, the second slide members are configured to slide the first slide members in the first direction while moving in a second direction different from the first direction.

2. The wearable electronic device of claim 1, wherein, with a sliding movement of the first slide members, the wearing frames are configured to contact an outer surface of the case.

3. The wearable electronic device of claim 2, wherein the wearing frames comprise:
a first portion contacting the case; and
a second portion not contacting the case,
wherein the first portion has a higher flexibility than the second portion.

4. The wearable electronic device of claim 1, wherein the adjusting part further comprises at least one first slide boss on the first slide members, and
wherein the at least one first slide boss is located in a first slide hole and is fastened to one of the wearing frames.

5. The wearable electronic device of claim 1, further comprising:
first wiring holes on the first slide members; and
second wiring holes on the wearing frames and facing the first wiring holes,
wherein the first wiring holes and the second wiring holes at least partially overlap with the first slide holes.

6. The wearable electronic device of claim 5, further comprising:
at least one electronic component provided in the case; and
a cable or a flexible printed circuit board connected to the at least one electronic component,
wherein the cable or the flexible printed circuit board is wired into one of the wearing frames through at least one of the first wiring holes, at least one of the first slide holes, and at least one of the second wiring holes.

7. The wearable electronic device of claim 6, wherein the at least one electronic component comprises at least one of a circuit board or a battery.

8. The wearable electronic device of claim 1, wherein the driving structure comprises:
a rotation gear provided in the case, and
a rotary handle provided on an outer surface of the case and configured to rotate together with the rotation gear, and
wherein the second slide members comprise rack gears configured to mesh with the rotation gear, and
wherein, with rotation of the rotation gear, the second slide members are configured to slide in the second direction by way of the rack gears meshing with the rotation gear.

9. The wearable electronic device of claim 8, wherein the driving structure further comprises:
a first gear base provided on an inner surface of the case and on the rotary handle, and
a second gear base coupled with the first gear base and facing the first gear base,
wherein the rotation gear is on the second gear base.

10. The wearable electronic device of claim 9, wherein the adjusting part further comprises a first holder member facing the inner surface of the case,
wherein at least a portion of the driving structure is between the first holder member and the inner surface of the case,
wherein the second gear base faces a first surface of the first holder member, and
wherein the rotation gear penetrates the first holder member and is configured to mesh with the rack gears on a second surface of the first holder member.

11. The wearable electronic device of claim 10, wherein the adjusting part further comprises a second holder member coupled with the first holder member and facing the first holder member, and
wherein at least portions of the second slide members are provided between the first holder member and the second holder member.

12. The wearable electronic device of claim 1, further comprising:
second slide holes on the wearing frames; and
at least one slide boss provided on the case,
wherein, with sliding movement of the first slide members, the at least one second-slide boss is configured to slide inside a second slide hole.

13. The wearable electronic device of claim 1, wherein the wearing frames are configured to at least partially conceal the first slide holes at a first position, and
wherein the first slide members are configured to at least partially close the first slide holes at a second position different from the first position.

14. The wearable electronic device of claim 1, further comprising a cable or a flexible printed circuit board connected to the display part, wherein the cable or the flexible printed circuit board is wired from inside the wearing frames into the case by penetrating the wearing frames and the first slide members.

15. The wearable electronic device of claim 14, further comprising a circuit board or a battery inside the case,
wherein the circuit board or the battery is electrically connected to the display part through the cable or the flexible printed circuit board.

* * * * *